(12) United States Patent
Chen et al.

(10) Patent No.: US 12,503,414 B2
(45) Date of Patent: Dec. 23, 2025

(54) MICROPOROUS HYDROGEN-BONDED ORGANIC FRAMEWORK FOR SEPARATING PROPYLENE FROM PROPANE

(71) Applicants: Board of Regents, The University of Texas System, Austin, TX (US); Fujian Normal University, Fujian (CN)

(72) Inventors: Banglin Chen, San Antonio, TX (US); Zhangjing Zhang, Fujian (CN); Shengchang Xiang, Fujian (CN)

(73) Assignees: BOARD OF REGENTS, THE UNIVERSITY OF TEXAS SYSTEM, Austin, TX (US); FUJIAN NORMAL UNIVERSITY, Fujian (CN)

( * ) Notice: Subject to any disclaimer, the term of this patent is extended or adjusted under 35 U.S.C. 154(b) by 298 days.

(21) Appl. No.: 18/318,002

(22) Filed: May 16, 2023

(65) Prior Publication Data
US 2023/0399277 A1    Dec. 14, 2023

Related U.S. Application Data

(60) Provisional application No. 63/342,550, filed on May 16, 2022.

(51) Int. Cl.
   *C07C 7/11*    (2006.01)
   *B01J 20/22*   (2006.01)
   (Continued)

(52) U.S. Cl.
   CPC ............ *C07C 7/11* (2013.01); *B01J 20/226* (2013.01); *C07C 9/08* (2013.01); *C07C 11/06* (2013.01)

(58) Field of Classification Search
   CPC .......... B01J 20/226; C07C 11/06; C07C 7/11; C07C 9/08
   See application file for complete search history.

(56) References Cited

U.S. PATENT DOCUMENTS

2015/0360166 A1* 12/2015 First .................. B01D 53/04
                                                              96/108

OTHER PUBLICATIONS

Amedi, Hamid Reza, and Masoud Aghajani. "Economic estimation of various membranes and distillation for propylene and propane separation." *Industrial & Engineering Chemistry Research* 57.12 (2018): 4366-4376.

(Continued)

*Primary Examiner* — Sharon Pregler
(74) *Attorney, Agent, or Firm* — pH IP Law

(57) ABSTRACT

Methods of using an organic framework (OF) are provided herein, including methods of using an OF comprising a repeat unit of the formula:

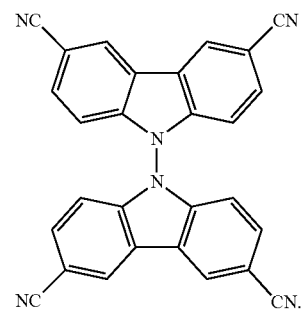

The OFs provided herein may be used in the separation of two or more molecules from each other. In some embodiments, the molecules are propylene and propane.

25 Claims, 20 Drawing Sheets
(20 of 20 Drawing Sheet(s) Filed in Color)

(51) Int. Cl.
C07C 9/08 (2006.01)
C07C 11/06 (2006.01)

(56) References Cited

OTHER PUBLICATIONS

Bachman, Jonathan E., et al. "M2 (m-dobdc)(M= Mn, Fe, Co, Ni) metal-organic frameworks as highly selective, high-capacity adsorbents for olefin/paraffin separations." *Journal of the American Chemical Society* 139.43 (2017): 15363-15370.

Bae, Youn-Sang, et al. "High propene/propane selectivity in isostructural metal-organic frameworks with high densities of open metal sites." *Angewandte Chemie International Edition* 51.8 (2012): 1857-1860.

Bloch, Eric D., et al. "Hydrocarbon separations in a metal-organic framework with open iron (II) coordination sites." *science* 335.6076 (2012): 1606-1610.

Cadiau, Amandine, et al. "A metal-organic framework-based splitter for separating propylene from propane." *Science* 353.6295 (2016): 137-140.

Chen, Kai-Jie, et al. "Synergistic sorbent separation for one-step ethylene purification from a four-component mixture." *Science* 366.6462 (2019): 241-246.

Chen, Teng-Hao, et al. "Thermally robust and porous noncovalent organic framework with high affinity for fluorocarbons and CFCs." *Nature communications* 5.1 (2014): 5131.

Chen, Zhijie, et al. "Balancing volumetric and gravimetric uptake in highly porous materials for clean energy." *Science* 368.6488 (2020): 297-303.

Cui, Xili, et al. "Pore chemistry and size control in hybrid porous materials for acetylene capture from ethylene." *Science* 353.6295 (2016): 141-144.

Ding, Qi, et al. "Exploiting equilibrium-kinetic synergetic effect for separation of ethylene and ethane in a microporous metal-organic framework." *Science Advances* 6.15 (2020): eaaz4322.

Ding, Xiaojun, et al. "Binary Solvent Regulated Architecture of Ultra-Microporous Hydrogen-Bonded Organic Frameworks with Tunable Polarization for Highly-Selective Gas Separation." *Angewandte Chemie International Edition* 61.13 (2022): e202116483.

Dobladez, José Antonio Delgado, et al. "Separation of the propane propylene mixture with high recovery by a dual PSA process." *Computers & Chemical Engineering* 136 (2020): 106717.

Furukawa, Hiroyasu, et al. "The chemistry and applications of metal-organic frameworks." *Science* 341.6149 (2013): 1230444.

Geier, Stephen J., et al. "Selective adsorption of ethylene over ethane and propylene over propane in the metal-organic frameworks M 2 (dobdc)(M= Mg, Mn, Fe, Co, Ni, Zn)." *Chemical Science* 4.5 (2013): 2054-2061.

He, Yabing, Rajamani Krishna, and Banglin Chen. "Metal-organic frameworks with potential for energy-efficient adsorptive separation of light hydrocarbons." *Energy & Environmental Science* 5.10 (2012): 9107-9120.

Hisaki, Ichiro, et al. "Designing hydrogen-bonded organic frameworks (HOFs) with permanent porosity." *Angewandte Chemie International Edition* 58.33 (2019): 11160-11170.

Knebel, Alexander, et al. "Solution processable metal-organic frameworks for mixed matrix membranes using porous liquids." *Nature Materials* 19.12 (2020): 1346-1353.

Krause, Simon, Nobuhiko Hosono, and Susumu Kitagawa. "Chemistry of soft porous crystals: structural dynamics and gas adsorption properties." *Angewandte Chemie International Edition* 59.36 (2020): 15325-15341.

Li, Jia, et al. "Metal-organic framework containing planar metal-binding sites: efficiently and cost-effectively enhancing the kinetic separation of C2H2/C2H4." *Journal of the American Chemical Society* 141.9 (2019): 3807-3811.

Li, Jian-Rong, Ryan J. Kuppler, and Hong-Cai Zhou. "Selective gas adsorption and separation in metal-organic frameworks." *Chemical Society Reviews* 38.5 (2009): 1477-1504.

Li, Kunhao, et al. "Zeolitic imidazolate frameworks for kinetic separation of propane and propene." *Journal of the American Chemical Society* 131.30 (2009): 10368-10369.

Li, Libo, et al. "Ethane/ethylene separation in a metal-organic framework with iron-peroxo sites." *Science* 362.6413 (2018): 443-446.

Li, Penghao, et al. "Interpenetration isomerism in triptycene-based hydrogen-bonded organic frameworks." *Angewandte Chemie* 131.6 (2019): 1678-1683.

Liang, Bin, et al. "An ultramicroporous metal-organic framework for high sieving separation of propylene from propane." *Journal of the American Chemical Society* 142.41 (2020): 17795-17801.

Liao, Pei-Qin, et al. "Controlling guest conformation for efficient purification of butadiene." *Science* 356.6343 (2017): 1193-1196.

Lin, Rui-Biao, et al. "Molecular sieving of ethylene from ethane using a rigid metal-organic framework." *Nature materials* 17.12 (2018): 1128-1133.

Liu, Ruoyang, et al. "Covalent organic frameworks: an ideal platform for designing ordered materials and advanced applications." *Chemical Society Reviews* 50.1 (2021): 120-242.

Ma, Tianqiong, et al. "Single-crystal x-ray diffraction structures of covalent organic frameworks." *Science* 361.6397 (2018): 48-52.

Mastalerz, Michael, and Iris M. Oppel. "Rational construction of an extrinsic porous molecular crystal with an extraordinary high specific surface area." *Angewandte Chemie International Edition* 51.21 (2012): 5252-5255.

Moretti, Christian, Martin Junginger, and Li Shen. "Environmental life cycle assessment of polypropylene made from used cooking oil." *Resources, Conservation and Recycling* 157 (2020): 104750.

Pulido, Angeles, et al. "Functional materials discovery using energy-structure-function maps." *Nature* 543.7647 (2017): 657-664.

Ren, Tao, Martin Patel, and Kornelis Blok. "Olefins from conventional and heavy feedstocks: Energy use in steam cracking and alternative processes." *Energy* 31.4 (2006): 425-451.

Sholl, David S., and Ryan P. Lively. "Seven chemical separations to change the world." *Nature* 532.7600 (2016): 435-437.

Wang, Hao, et al. "One-of-a-kind: a microporous metal-organic framework capable of adsorptive separation of linear, mono-and di-branched alkane isomers via temperature-and adsorbate-dependent molecular sieving." *Energy & Environmental Science* 11.5 (2018): 1226-1231.

Wang, Hao, et al. "Tailor-made microporous metal-organic frameworks for the full separation of propane from propylene through selective size exclusion." *Advanced materials* 30.49 (2018): 1805088.

Wang, Yuxiang, Shing Bo Peh, and Dan Zhao. "Alternatives to cryogenic distillation: advanced porous materials in adsorptive light olefin/paraffin separations." *Small* 15.25 (2019): 1900058.

Yang, Sihai, et al. "Supramolecular binding and separation of hydrocarbons within a functionalized porous metal-organic framework." *Nature Chemistry* 7.2 (2015): 121-129.

Yang, Wenbin, et al. "Exceptional thermal stability in a supramolecular organic framework: porosity and gas storage." *Journal of the American Chemical Society* 132.41 (2010): 14457-14469.

Yang, Yisi, et al. "Ethylene/ethane separation in a stable hydrogen-bonded organic framework through a gating mechanism." *Nature Chemistry* 13.10 (2021): 933-939.

Zeng, Heng, et al. "Orthogonal-array dynamic molecular sieving of propylene/propane mixtures." *Nature* 595.7868 (2021): 542-548.

Zhai, Quan-Guo, et al. "An ultra-tunable platform for molecular engineering of high-performance crystalline porous materials." *Nature Communications* 7.1 (2016): 13645.

Zheng, Bin, and Guillaume Maurin. "Mechanical control of the kinetic propylene/propane separation by zeolitic imidazolate framework-8." *Angewandte Chemie International Edition* 58.39 (2019): 13734-13738.

Zhou, Sheng, et al. "Paralyzed membrane: Current-driven synthesis of a metal-organic framework with sharpened propene/propane separation." *Science advances* 4.10 (2018): eaau1393.

\* cited by examiner

MICROPOROUS HYDROGEN-BONDED ORGANIC FRAMEWORK FOR SEPARATING PROPYLENE FROM PROPANE

This application claims the benefit of priority to U.S. Provisional Application No. 63/342,550, filed on May 16, 2022, the entire contents of which are hereby incorporated by reference.

BACKGROUND

I. Field

The present disclosure relates generally to the fields of chemistry and materials science. More particularly, it concerns methods of use of organic frameworks, including separating gas molecules such as propylene and propane.

II. Description of Related Art

Propylene ($C_3H_6$) is one of the most versatile monomers and has been widely used in various consumer and industrial products. In 2018, the global production of polypropylene, which is considered as the world's second most important synthetic plastic (second to polyethylene), was estimated at 56 Mt. Notably, the demand for this material is projected to increase to 88 Mt by 2026, with a growth rate of approximately 4% (Zhou et al, 2018; Zheng et al, 2019; Moretti et al, 2020). Before using $C_3H_6$ for the production of polypropylene or acrylonitrile, it must be purified to a specific high purity (polymer-grade>99.5%; chemical-grade>94%), which typically involves the separation of $C_3H_6$ from propane ($C_3H_8$) mixtures (He et al, 2012; Amedi et al, 2018; Bloch et al, 2012). Currently, $C_3H_6/C_3H_8$ separations must be performed at low temperatures and high pressures and are among the most energy-intensive processes carried out on a large scale in the chemical industry. For instance, the energy consumption of cryogenic distillation accounts for approximately 10-15% of the world's total energy consumption (Sholl et al, 2016; Chen et al, 2019). To improve the energy efficiency of these techniques, adsorptive separation methods based on porous materials have attracted significant interest. Such approaches are regarded as promising alternatives to traditional distillation processes due to potential energy savings (Yang et al, 2014; Cui et al, 2016; Furukawa et al, 2013; Liao et al, 2017; Zhai et al, 2016; Wang et al, 2019). It is estimated that compared to conventional cryogenic technologies, advanced non-thermal separation techniques could result in approximately 15-38% energy saving in $C_3H_6/C_3H_8$ separation processes (Ren et al, 2006; Dobladez et al, 2020). Nonetheless, adsorptive separation of high-purity $C_3H_6$ from its physically similar impurity $C_3H_8$ or from multi-component mixtures is a very challenging task and requires the use of effective adsorbents with ultrahigh selectivity and separation productivity (Bae et al, 2012; Cadiau et al, 2016; Wang et al, 2016).

Owing to their unique properties, including crystallinity, porosity, and tunable functionality, porous materials, such as metal-organic frameworks (MOFs) (Ding et al, 2020; Chen et al, 2020), covalent organic frameworks (COFs) (Liu et al, 2021; Ma et al, 2018), porous organic polymers (POPs) (Li et al, 2014), and hydrogen bonded-organic frameworks (HOFs) (A. Pulido et al, 2017; Li et al, 2019; Ding et al, 2022) have shown potential as adsorbents for olefin/paraffin adsorption and separation (Li et al, 2018; Li et al, 2019; Knebel et al, 2020). Research concerning $C_3H_6/C_3H_8$ separation can be roughly divided into three categories: equilibrium separation, kinetic separation, and molecular sieving (Wang et al, 2019; Lin et al, 2018; Bachman et al, 2017). The first two separation strategies often result in simultaneous adsorption of both $C_3H_8$ and $C_3H_6$; thus, they exhibit low selectivity (Geier et al, 2013; Li et al, 2009). Few studies involving molecular sieving of $C_3H_6$ from $C_3H_8$ mixtures have been reported. In 2016, Eddaoudi et al. (Cadiau et al, 2016) described an ultramicroporous MOF, namely KAUST-7, which was shown to selectively adsorb $C_3H_6$ via ultrafine-tuning of the pore aperture size and shape, thus completely excluding $C_3H_8$. Two years later, Li et al. (Wang et al, 2018) designed a rare-earth-based MOF material (i.e., Y-abtc) displaying optimized cage-like pores, which increased the $C_3H_6$ capture capacity as well as the kinetic adsorption rate. In the meantime, the adsorption of $C_3H_8$ was completely blocked; therefore, the $C_3H_6$ separation performance was significantly enhanced. In 2020, Lin et al. (Liang et al, 2020) reported an ultramicroporous cobalt gallate MOF (Co-gallate) for the highly selective sieving separation of $C_3H_6/C_3H_8$ at ambient conditions featuring pore confinement and pore size matching. Recently, Li et al. (Zeng et al, 2021) introduced a rigid molecular sieving material (JNU-3) work well for $C_3H_6/C_3H_8$ separation. Although the above molecular sieving materials achieved complete sieving of $C_3H_6$ from $C_3H_8$, they were limited by small pore volume and narrow pores, which resulted in relatively low adsorption capacity and diffusion rate. In industrial production, to achieve high flux, high selectivity, and fast equilibrium, higher operating temperature and pressure are often needed. Thus, methods to achieve separations of gaseous mixtures, such as the separation of propylene from propane in order to obtain purer propylene and/or purer propane, under these conditions and/or which utilize materials that are stable and recyclable, are of great importance.

SUMMARY

In some aspects, the present disclosure provides organic frameworks formed through a hydrogen bond network. In some embodiments, the methods described herein provide for the separation of a mixture of an alkene$_{(C \leq 8)}$, and an alkane$_{(C \leq 8)}$ comprising contacting the mixture described herein and wherein the method is further characterized by a temperature-dependent variation in gating pressure of the alkane.

In some embodiments, the present disclosure provides methods of separating propylene from a mixture containing propylene, comprising contacting the mixture with a framework of repeating units of the formula:

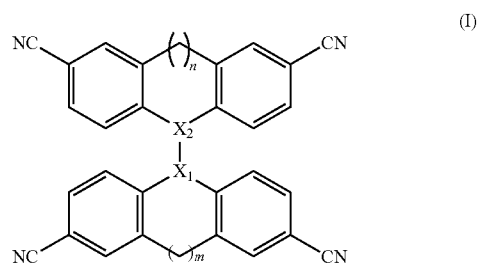

(I)

wherein
$X_1$ and $X_2$ are independently $CH_2$ or N;
m and n are independently 0 or 1;
or a hydrate thereof;

In some embodiments, the formula is further defined as:

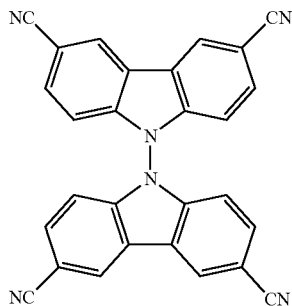 [SMILES: N#Cc1ccc2c(c1)c1cc(C#N)ccc1n2-n1c2ccc(C#N)cc2c2cc(C#N)ccc21]

or a hydrate thereof.

In some embodiments, the framework contains a plurality of pores. In further embodiments, the pores are from about 3 Å to about 4 Å.

In some embodiments, the propylene is in the gaseous form. In some embodiments, the mixture containing propylene is a mixture of molecules in the gaseous form. In some embodiments, the mixture containing propylene comprises a mixture of propylene and propane. In further embodiments, both the propylene and propane are in the gaseous form. In some embodiments, the mixture is about an equimolar mixture of propylene and propane. In some embodiments, the mixture further comprises at least one gas from the group of consisting of $CH_4$, $C_2H_4$, $C_2H_6$, $CO_2$, and $H_2$.

In some embodiments, the framework exhibits a selectivity for propylene over propane of greater than 100. In further embodiments, the selectivity for propylene over propane is greater than 600. In some embodiments, the framework exhibits an uptake ratio for propylene over propane greater than 25. In further embodiments, the framework has an uptake ratio for propylene over propane greater than 50. In some embodiments, the material has a capture capacity from about 4 to about 6 mol kg$^{-1}$. In further embodiments, the capture capacity is from about 4.8 to about 5.4 mol kg$^{-1}$.

In some embodiments, the method is carried out at a temperature from about 10° C. to about 100° C. In further embodiments, the temperature is from about 20° C. to about 40° C., such as at about 25° C. In other embodiments, the temperature is from about 50° C. to about 70° C., such as at about 60° C. In some embodiments, the method is carried out at a pressure from about 5 mbar to about 7.5 bar. In further embodiments, the pressure is from about 500 mbar to about 5 bar. In some embodiments, the method is carried out at a pressure of about 1 bar. In other embodiments, the method is carried out at a pressure of about 3 bar.

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings form part of the present specification and are included to further demonstrate certain aspects of the present disclosure. The invention may be better understood by reference to one of these drawings in combination with the detailed description of specific embodiments presented herein.

(FIG. 1A) The syntheses process of crystal HOF-FJU-1. (FIG. 1B) SEM images of as-synthesized and activated HOF-FJU-1. (FIG. 1C and FIG. 1D) $N_2$ (77 K) and Ar (87 K) adsorption/desorption isotherms of HOF-FJU-1.

(FIG. 2A) Intermolecular hydrogen bonding connections between cyano groups in as-synthesized, guest-free, and $C_3H_6$-loaded HOF-FJU-1, derived from single-crystal X-ray analysis. (FIG. 2B) The change of the distance in pore I and pore II. (FIG. 2C) The change of electron density peaks in the structure in the Different Fourier maps ($2F_0$-$F_c$) for the same single crystal HOF-FJU-1 before and after $C_3H_6$-loaded at 150 K.

(FIG. 3A and FIG. 3B) Framework with pore channels along the b direction, alternating with small necks (I) and large cages (II). (FIG. 3C) Schematic diagram of molecule sieving of $C_3H_6$ based on the minimum cross-sectional areas. (FIG. 3D) Top view of the packing diagram of the $C_3H_6$ adsorbed structure. (FIG. 3E and FIG. 3F) Preferential binding sites for $C_3H_6$ molecules in channel (site I and site II) and their close interactions with the framework. Grey, blue, and white nodes represent the C, N, and H atoms, respectively. Green and white spheres indicate the C and H atoms of $C_3H_6$, correspondingly.

(FIG. 4A to FIG. 4C) Single-component adsorption-desorption isotherms of $C_3H_6$ and $C_3H_8$ for HOF-FJU-1 at 298, 318, and 333 K; Inset: adsorption isotherms of $C_3H_6$ at low pressure. (FIG. 4D) A comparison of the adsorption isotherms of $C_3H_6$ (ball) and $C_3H_8$ (dot) in HOF-FJU-1, Y-abtc, JNU-3, Co-gallate, and KAUST-7 at 333 K. (FIG. 4E) IAST selectivities of $C_3H_6$/$C_3H_8$ (50/50) mixtures on HOF-FJU-1, Y-abtc, JNU-3, Co-gallate, and KAUST-7. (FIG. 4F) Comparison of the $C_3H_6$ uptake, $C_3H_6$/$C_3H_8$ selectivities, and $C_3H_6$/$C_3H_8$ uptake ratios of referred materials at 1 bar and 333 K.

(FIG. 5A) Single-component adsorption-desorption isotherms of $C_3H_6$ and $C_3H_8$ on HOF-FJU-1 at 298, 308, 318, 323, 328 and 333 K. (FIG. 5B) Isosteric heats of $C_3H_6$ adsorption in HOF-FJU-1 calculated by using virial equation.

(FIG. 6A) PXRD patterns of Y-abtc, JNU-3, Co-gallate, and KAUST-7. (FIG. 6B to FIG. 6E) single-component adsorption isotherms of $C_3H_6$ and $C_3H_8$ on Y-abtc, JNU-3, Co-gallate, and KAUST-7 at 298, 318 and 333 K.

(FIG. 7A) Calculated IAST selectivities of $C_3H_6$/$C_3H_8$ (50/50) mixtures on HOF-FJU-1 at 298, 308, 318, 323, 328, and 333 K. (FIG. 7B to FIG. 7D) IAST selectivities of $C_3H_6$/$C_3H_8$ (50/50) mixtures on Y-abtc, JNU-3, Co-gallate, and KAUST-7 at 298, 318, and 333 K.

(FIG. 8A) $C_3H_6$ and $C_3H_8$ adsorption isotherms at 298, 308, 318, 323, 328 and 333 K for HOF-FJU-1 with dual-site Langmuir- Freundlich model fits. (FIG. 8B to FIG. 8E) $C_3H_6$ and $C_3H_8$ adsorption isotherms at 298, 318 and 333 K for Y-abtc, JNU-3, Co-gallate, and KAUST-7 with dual-site Langmuir-Freundlich model fits.

(FIG. 9A) Schematic illustration of the apparatus for the breakthrough experiments. (FIG. 9B) Experimental breakthrough curves of $C_3H_6/C_3H_8$ (50/50) on KAUST-7 and Y-abtc at 318 K and 1 bar. (FIG. 9C) Concentration curves of the desorbed $C_3H_6$ from HOF-FJU-1 during the regeneration process (under vacuum). The fixed bed was pre-saturated by $C_3H_6/C_3H_8$ (50/50) mixture at 298 and 333 K, respectively. (FIG. 9D) The calculation for captured amount of $C_3H_6$ during the breakthrough process ($C_3H_6/C_3H_8$, 50/50) in HOF-FJU-1 and Y-abtc at 333 K and 1 bar.

(FIG. 10A) Experimental breakthrough curves for $C_3H_6/C_3H_8$ (50/50) mixtures on HOF-FJU-1 at 1 bar and 298-333 K. (FIG. 10B) Stability test for the separation of $C_3H_6/C_3H_8$ (50/50) on HOF-FJU-1 (333 K, 1 bar). (FIG. 10C) Experimental breakthrough curves for $C_3H_6/C_3H_8$ (50/50) mixtures on HOF-FJU-1 at 3 bar and 298-333 K. (FIG. 10D and FIG. 10E) Experimental breakthrough curves (1 bar, 298 and 333 K, respectively) for the separation of $C_3H_6/C_3H_8$ (50/50) on HOF-FJU-1, Y-abtc, JNU-3, Co-gallate, and KAUST-7. (FIG. 10F) Desorption curves of $C_3H_6$ (red) and $C_3H_8$ (black) from HOF-FJU-1 during the regeneration process. The fixed bed were saturated with the $C_3H_6/C_3H_8$ (50/50) mixture at 298 or 333 K, respectively.

(FIG. 11A and FIG. 11B) Kinetic adsorption curves of $C_3H_6$ and $C_3H_8$ for HOF-FJU-1 at 298, 308, 318 and 333 K (Pressure rise rate: 100 mbar min$^{-1}$). (FIG. 11C to FIG. 11F) Kinetic adsorption curves of $C_3H_6$ for Y-abtc, JNU-3, Co-gallate, and KAUST-7 at 298 and 333 K (Pressure rise rate: 100 mbar min$^{-1}$).

(FIG. 12A) Concentration curves of the desorbed $C_3H_6$ from HOF-FJU-1 during the regeneration process (vacuuming, $1 \times 10^{-5}$ bar). (FIG. 12B to FIG. 12E) Concentration curves of the desorbed $C_3H_6$ and desorption curves of $C_3H_6$ from Y-abtc, JNU-3, Co-gallate, and KAUST-7 during the regeneration process. The fixed bed was pre-saturated by $C_3H_6/C_3H_8$ (50/50) mixture at 298 and 333 K, respectively.

(FIG. 13A and FIG. 13B) Single-component adsorption isotherms of $CH_4$, $C_2H_4$, $C_2H_6$, $C_3H_6$, $C_3H_8$, $CO_2$, $N_2$, and $O_2$ in HOF-FJU-1 at 333 K. (FIG. 13C) PXRD patterns showing good stability of HOF-FJU-1 following adsorption and separation tests or exposure to air, $H_2O$, and $NH_3$. (FIG. 13D and FIG. 13E) Multi-component breakthrough and desorption curves of $CH_4/C_2H_4/C_2H_6/C_3H_6/C_3H_8/CO_2/H_2$ (31/10/25/10/10/1/13) mixtures on HOF-FJU-1. (FIG. 13F) $C_3H_6$ adsorption curves of as-synthesized HOF-FJU-1 as well as of HOF-FJU-1 following stability tests.

DESCRIPTION OF ILLUSTRATIVE EMBODIMENTS

Figures 1A, 1B, 1C, 1D:
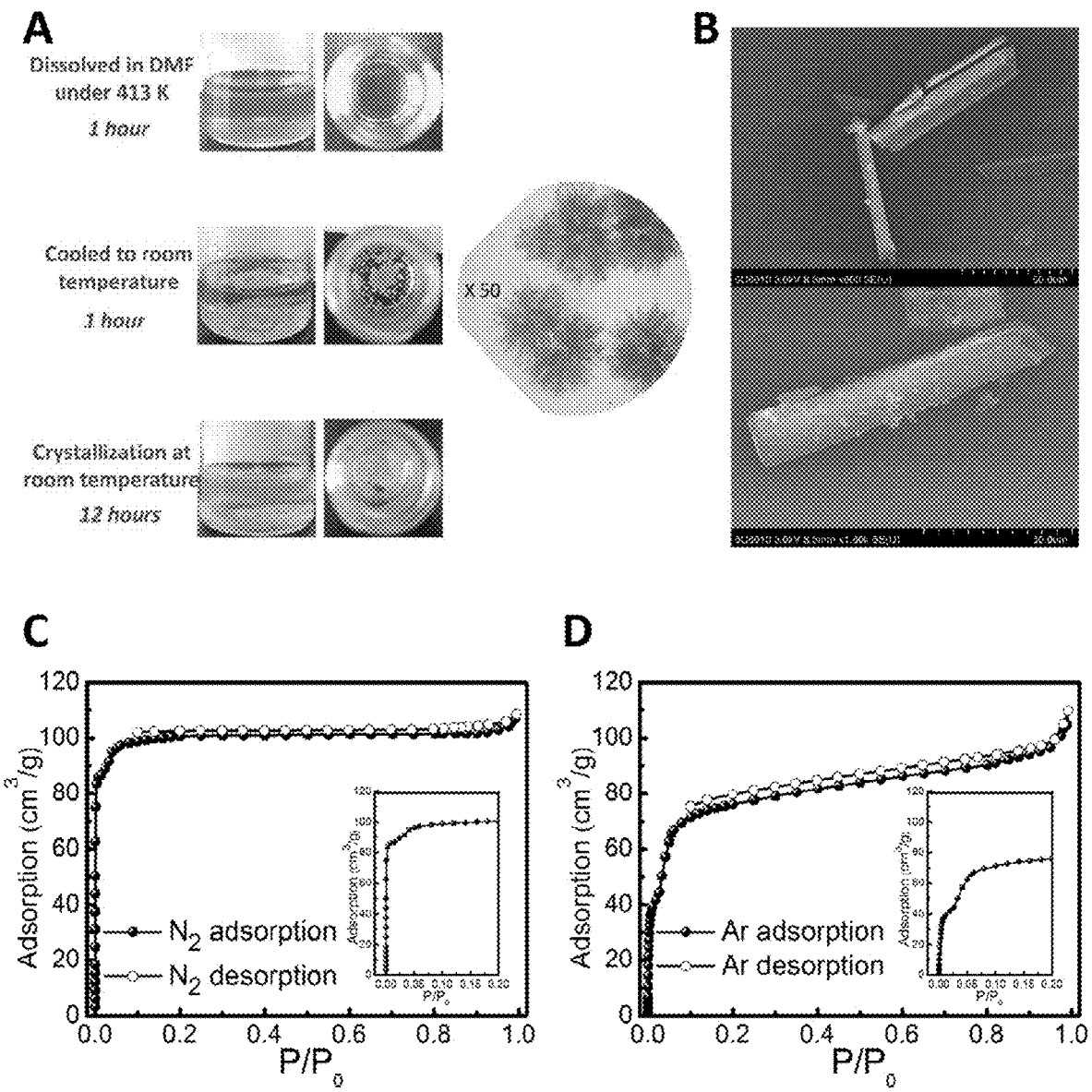
FIGS. 1A-1D: Synthesis, topography and BET characterization of HOF-FJU-1.

Provided herein are methods utilizing a HOF material exhibiting an optimized pore aperture and cavity to address challenging separations, for example $C_3H_6/C_3H_8$ separations. The developed material HOF-FJU-1 owing, without wishing to be bound by theory, to the thermoregulatory gating effect, successfully accomplished according to the methods disclosed herein the molecular sieving of $C_3H_6$ from $C_3H_8$ or other relative mixtures under convenient operation conditions. Notably, compared to known $C_3H_6$ sieving materials, such as Y-abtc, JNU-3, Co-gallate, and KAUST-7, HOF-FJU-1 displayed the highest $C_3H_6$ adsorption capacity (46.2 cm3 g$^{-1}$), $C_3H_6/C_3H_8$ uptake ratios (53), and $C_3H_6/C_3H_8$ (50/50) selectivity (616) at 333 K and 1 bar. The efficient thermoregulatory sieving separation of $C_3H_6$ was comprehensively analyzed by a combination of single-crystal structural evaluation, single-component adsorption tests, and various breakthrough experiments. Benefiting from the dynamic gating effect and rapid kinetic ad/desorption rate under high temperature, HOF-FJU-1 could be used for the production of high purity $C_3H_6$ from $C_3H_6/C_3H_8$ mixtures with a remarkably high separation productivity. The outstanding structural stability, high separation ability, and cycling performance further highlight the potential of this HOF adsorbent for application in separation processes requiring challenging conditions.

Due to the similar physical properties of $C_3H_6$ and $C_3H_8$, it is extremely difficult and challenging to achieve highly selective separation by using traditional adsorbents. More importantly, around these adsorbents, $C_3H_6$ sieving is the most effective way to obtain high-purity product and meet the practical need. As porous materials reported for molecule sieving of $C_3H_6$ are typically based on robust framework with narrow pore channels, which are limited by low capacity and slow diffusion rate. Provided herein are methods to achieve efficient and full separation of $C_3H_6$ from $C_3H_8$ or relative mixtures, provided herein are methods related to the use of HOF-FJU-1 provides a new thermoregulatory gating strategy to prove the feasibility of using the partial flexible framework to accommodate higher operating temperature and pressure, thus satisfy the demand for the diverse industrial conditions. Taking advantage of such high separation ability, outstanding structural stability, and cycling performance, further highlight the potential of the methods of the present disclosure for application in real separation processes. The methods provided herein also bring a new strategy by the thermoregulatory gating effect for developing more efficient adsorbents for the energy-efficient gas separation. The present methods relate to the use of the framework, HOF-FJU-1, which features temperature-controllable diffusion channels thus exhibiting a remarkable thermoregulatory gating effect (gate-opening pressure preciously regulate by temperature), which finally sieving $C_3H_6$ from $C_3H_8$ mixtures under convenient operation conditions (i.e., temperature of 298-333 K and pressure of 1~3 bar). Compared to $C_2H_4/C_2H_6$ separation, HOF-FJU-1 exhibits higher working capacity and separation performance when applied to separation $C_3H_6$ from $C_3H_8$ mixtures. Gas sorption, breakthrough experiments and crystallography studies collaborate HOF-FJU-1 has far the highest productivity for separation of high purity $C_3H_6$ from $C_3H_8$ or other relative industrial gas mixtures among the reported porous materials. Besides, benefiting the unique structural advantages (Yang et al, 2010; Mastalerz et al, 2012; Chen et al, 2014; Hisaki et al, 2019), this HOF material exhibits excellent stability and recyclability, further demonstrating its great potential for this important and challenging hydrocarbons separation. The following sections describe these aspects and more.

Methods of Chemical Separation Using OFs

In one aspect, the present disclosure provides methods of separating two or more compounds using an organic framework as described herein, wherein the OF comprises a repeating unit of the formula:

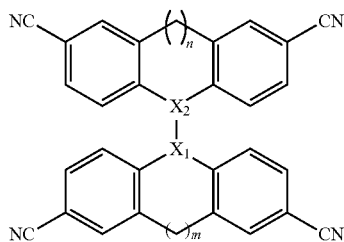

(I)

or a hydrate thereof, wherein the method comprises:

(A) combining the organic framework with a mixture comprising a first compound and a second compound; and (B) separating the first compound from the second compound within the organic framework.

In some embodiments, $X_1$ is $CH_2$. In other embodiments, $X_1$ is N. In some embodiments, $X_2$ is $CH_2$. In other embodiments, $X_2$ is N. In some embodiments, m is 0 or 1. In some embodiments, m is 1. In some embodiments, n is 0 or 1. In some embodiments, n is 0.

In some embodiments, the framework comprises a repeating unit of the formula:

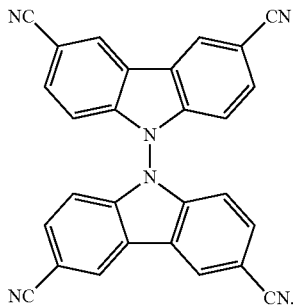

In some embodiments, the first compound or the second compound is a gas molecule. In some of these embodiments, both the first and second compounds are gas molecules. In some embodiments, the first compound is an alkene$_{(C \leq 8)}$ such as propylene. In other embodiments, the first compound is an alkyne$_{(C \leq 8)}$ such as propyne. Therefore, the methods of the present disclosure may facilitate almost complete removal of propylene from propane. In still other embodiments, the first compound is $CO_2$. In some embodiments, the second compound is an alkane$_{(C \leq 8)}$, such as propane, ethane, or methane. In other embodiments, the second compound is $N_2$.

In some embodiments, the mixture comprises from about 1:999 to about 1:1 of the first compound to the second compound. In other embodiments, the mixture comprises from about 1:999 to about 1:1 of the second compound to the first compound. In some embodiments, the separation is carried out at a pressure from about 0.0.005 bar to about 10 bar, such as at a pressure of about 1 bar.

In some embodiments, the organic framework is adhered to a fixed bed surface. In some embodiments, the separation is carried out in an absorber packed with the organic framework. In some embodiments, the separation is carried out at a temperature from about 0° C. to about 75° C., such as at about room temperature. In other embodiments, the separation is carried out at about 60° C.

In still another aspect, the present disclosure provides a method of separating propylene from a mixture of propane and propylene comprising exposing the mixture to an organic framework as described herein.

Definitions

"organic frameworks" (OFs) are framework materials, typically three-dimensional, self-assembled by the coordination of functional groups on organic linkers exhibiting porosity, typically established by gas adsorption. The OFs discussed and disclosed herein are at times simply identified by their repeat unit as defined below without brackets or the subscript n.

The term "unit cell" is basic and least volume consuming repeating structure of a solid. The unit cell is described by its angles between the edges ($\alpha$, $\beta$, $\gamma$) and the length of these edges (a, b, c). As a result, the unit cell is the simplest way to describe a single crystal X-ray diffraction pattern.

A "repeat unit" is the simplest structural entity of certain materials, for example, frameworks and/or polymers, whether organic, inorganic or metal-organic. In the case of a polymer chain, repeat units are linked together successively along the chain, like the beads of a necklace. For example, in polyethylene, —[—$CH_2CH_2$—]$_n$—, the repeat unit is —$CH_2CH_2$—. The subscript "n" denotes the degree of polymerization, that is, the number of repeat units linked together. When the value for "n" is left undefined, it simply designates repetition of the formula within the brackets as well as the polymeric and/or framework nature of the material. The concept of a repeat unit applies equally to where the connectivity between the repeat units extends into three dimensions, such as in metal organic frameworks (MOFs), OFs, cross-linked polymers, thermosetting polymers, etc. Note that for in some cases the repeat unit may also be shown without the subscript n.

"Pores" or "micropores" in the context of organic and metal-organic frameworks are defined as open space within the OFs or MOFs; pores become available when the OF or MOF is activated for the storage of gas molecules. Activation can be achieved by heating, e.g., to remove solvent molecules.

"Multimodal size distribution" is defined as pore size distribution in three dimensions.

"Multidentate organic linker" is defined as ligand having several binding sites for the coordination to one or more metal ions.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$. Additionally, it is contemplated that one or more of the metal atoms may be replaced by another isotope of that metal. In some embodiments, the calcium atoms can be $^{40}Ca$., $^{42}Ca$, $^{43}Ca$, $^{44}Ca$, $^{46}Ca$, or $^{48}Ca$. Similarly, it is contemplated that one or more carbon atom(s) of a compound of the present invention may be replaced by a silicon atom(s). Furthermore, it is contemplated that one or more oxygen atom(s) of a compound of the present invention may be replaced by a sulfur or selenium atom(s).

Any undefined valency on a carbon atom of a structure shown in this application implicitly represents a hydrogen atom bonded to the atom.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

The term "saturated" when referring to an atom means that the atom is connected to other atoms only by means of single bonds.

The above definitions supersede any conflicting definition in any of the reference that is incorporated herein by reference. The fact that certain terms are defined, however, should not be considered as indicative that any term that is undefined is indefinite. Rather, all terms used are believed to describe the invention in terms such that one of ordinary skill can appreciate the scope and practice the present invention.

III. Examples

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1: Synthesis and Characterization of HOF-FJU-1

Figures 2A, 2B, 2C:
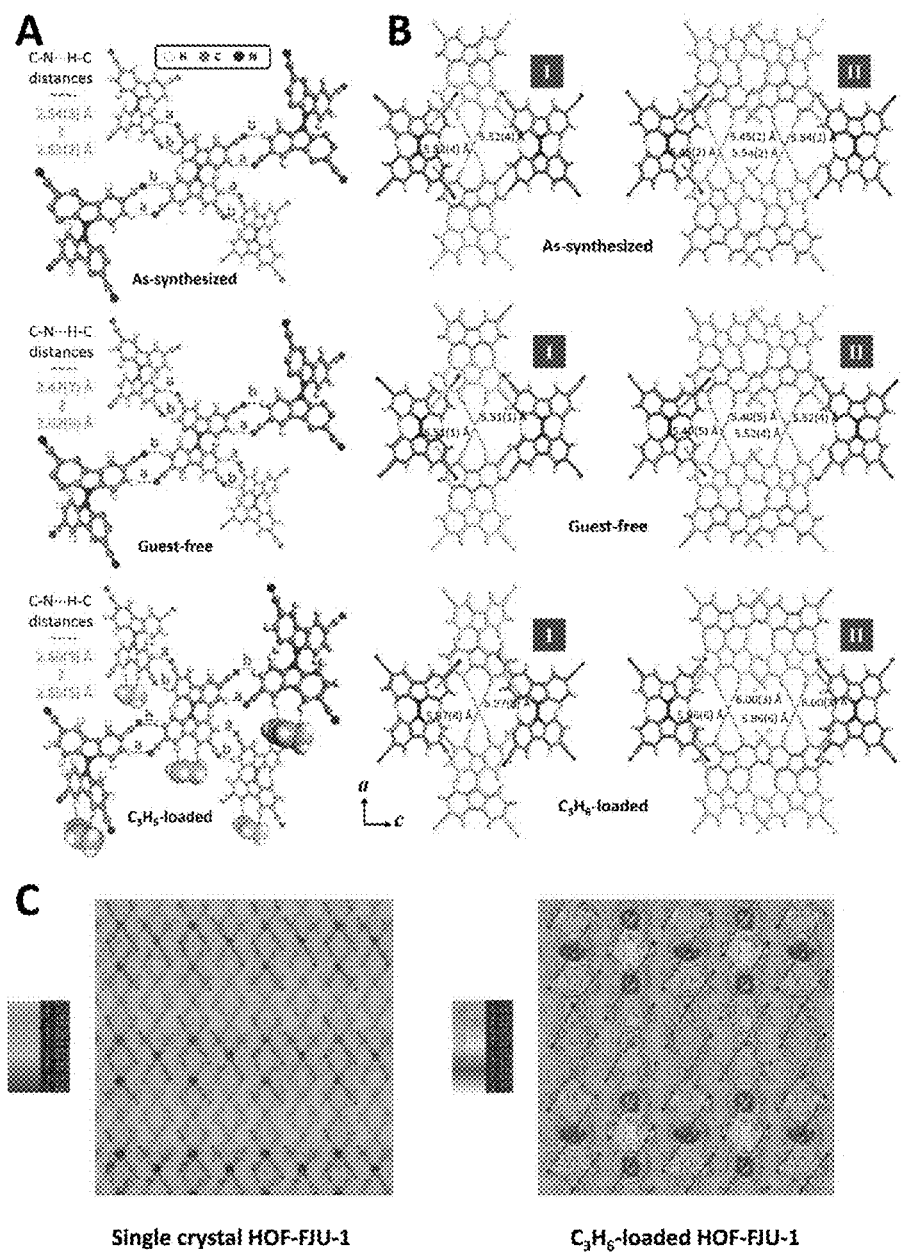
FIGS. 2A-2C: Structural change of HOF-FJU-1 before and after $C_3H_6$-loaded.
Figures 3A, 3B, 3C, 3D, 3E, 3F:
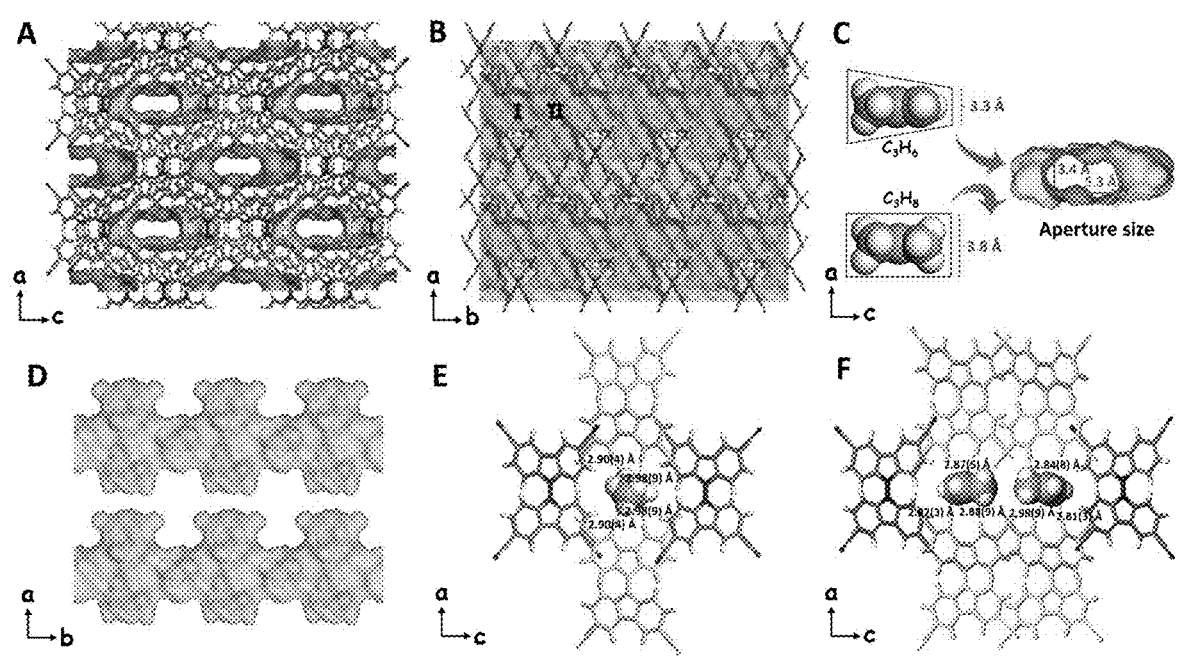
FIGS. 3A-3F: Single-crystal structure of guest-free and $C_3H_6$-loaded HOF-FJU-1.

High-quality single crystals of HOF-FJU-1 were obtained by crystallization of 3,3', 6,6'-tetracyano-9,9'-bicarbazole in a hot saturated solution of N,N'-dimethylformamide solution (FIG. 1). In the synthesized framework, each bi-carbazole is shown to be linked to four neighboring bi-carbazole units to form a single network involving C—N—H—C hydrogen bonds with distances of 2.54(3)-2.63(2) Å (FIG. 2A). Through multiple interpenetrations, one-dimensional channels with alternating large cages and small necks were formed along the b direction (FIG. 3A and FIG. 3B). Guest-free HOF-FJU-1 exhibited an aperture size of 3.4×5.3 Å$^2$. Notably, the minimum dimension of this aperture was marginally larger than the minimum cross-section of $C_3H_6$ (3.3×4.2 Å$^2$); however, smaller than that of $C_3H_8$ (3.8×4.1 Å$^2$) (FIG. 3C) (J. R. Li et al, 2009). Thus, without being bound by theory, the entry of guest molecules was probably accurately regulated by the dynamic motions of the pore apertures.

The porosity of HOF-FJU-1 and its adsorption characteristics were determined by $N_2$ and Ar sorption at 77 and 87 K, respectively. The stepwise adsorption phenomenon was an important indication of the partial flexibility of HOF-FJU-1. It was evident as a steep $N_2$ or Ar adsorption into the initial channels, which was followed by a further uptake due to the slight flexibility of the structure. As shown in FIG. 1C, the amount of adsorbed $N_2$ in the first step reached 90.2 cm$^3$ g$^{-1}$ at P/P$_0$=0.03. A slight adsorption increase to 97.3 cm$^3$ g$^{-1}$ at P/P$_0$=0.058 was observed in the second step. Finally, the amount of adsorbed $N_2$ was established at 107.6 cm$^3$ g$^{-1}$ at 1 bar. Brunauer-Emmett-Teller (BET) and Langmuir surface area calculated from the $N_2$ adsorption isotherms were 382.4 and 439.1 m$^2$ g$^{-1}$, respectively. Furthermore, a similar stepwise adsorption isotherm was observed for sorption at 87 K (FIG. 1D), i.e., the adsorption curve exhibited an uptake increase at approximately P/P$_0$=0.05. In addition, the calculated BET and Langmuir surface areas were 295.9 and 384.8 m$^2$ g$^{-1}$, respectively.

To accurately understand the interactions between $C_3H_6$ molecules and HOF-FJU-1 from a structural perspective as well as to determine the binding configuration of $C_3H_6$, single-crystal X-ray diffraction (SCXRD) measurements were carried out on $C_3H_6$-loaded HOF-FJU-1 at the temperature of 150 K. Based on this data, the location of the $C_3H_6$ molecules was identified by a significant increase in the residual electron intensity (FIG. 2C and Table 1). As shown in FIG. 3D, one $C_3H_6$ molecule was located in each neck and two molecules were located in each large pore cavity. The molecules were well dispersed along the one-dimensional channel and only host-guest interactions were observed. The orientation of the $C_3H_6$ molecules in the channels minimized the possible steric hindrance from the framework. Multiple interactions, mainly C—H—C distances of approximately 2.81(3) to 2.98(9) Å, were noted (FIG. 1E and FIG. 1F). The intermolecular interactions between the guest molecules and the framework led to a slight structural change (FIG. 2), suggesting, without being bound by theory, high binding affinity of HOF-FJU-1 toward the $C_3H_6$ molecules.

TABLE 1

Crystallographic Data and Structural Refinement Summary.

| Compounds | HOF-FJU-1 (guest-free) | HOF-FJU-1 ($C_3H_6$-loaded) |
|---|---|---|
| CCDC | 1999088 | 2006154 |
| Empirical formula | $C_{42}H_{18}N_9$ | $C_{45.79}H_{26.02}N_9$ |
| Formula weight | 648.65 | 702.23 |
| Temperature (K) | 333 | 150 |
| Crystal system | orthorhombic | orthorhombic |
| Space group | Pnn2 | Pnn2 |
| a (Å) | 12.5417(6) | 12.3272(3) |
| b (Å) | 14.2711(8) | 14.9598(8) |
| c (Å) | 19.6747(9) | 19.7475(7) |
| α (°) | 90 | 90 |
| β (°) | 90 | 90 |
| γ (°) | 90 | 90 |
| Volume (Å$^3$) | 3521.5(3) | 3641.7(3) |
| Z | 4 | 4 |
| $D_c$ (g cm$^{-3}$) | 1.223 | 1.281 |
| μ (mm$^{-1}$) | 0.607 | 0.625 |
| F(000) | 1332.0 | 1455.0 |
| Crystal size (mm$^3$) | 0.03 × 0.02 × 0.15 | 0.03 × 0.05 × 0.20 |
| Radiation | Cu—Kα (λ = 1.54184 Å) | Cu—Kα (λ = 1.54184 Å) |

TABLE 1-continued

Crystallographic Data and Structural Refinement Summary.

| Compounds | HOF-FJU-1 (guest-free) | HOF-FJU-1 ($C_3H_6$-loaded) |
|---|---|---|
| Goodness-of-fit on $F^2$ | 1.064 | 1.032 |
| Final R indexes [I >= 2σ (I)][a] | $R_1$ = 0.0581, $wR_2$ = 0.1528 | $R_1$ = 0.0686, $wR_2$ = 0.1856 |
| Final R indexes [all data][a] | $R_1$ = 0.0943, $wR_2$ = 0.1916 | $R_1$ = 0.0792, $wR_2$ = 0.1972 |

[a] $R_1 = \Sigma ||F_o| - |F_c||/\Sigma|F_o|$; $wR_2 = [\Sigma w(|F_o|^2 - |F_c|^2)^2/\Sigma w(F_o^2)^2]^{1/2}$

Example 2: Adsorption Experiments and Comparison with Existing Materials

Figures 4A, 4B, 4C, 4D, 4E, 4F:
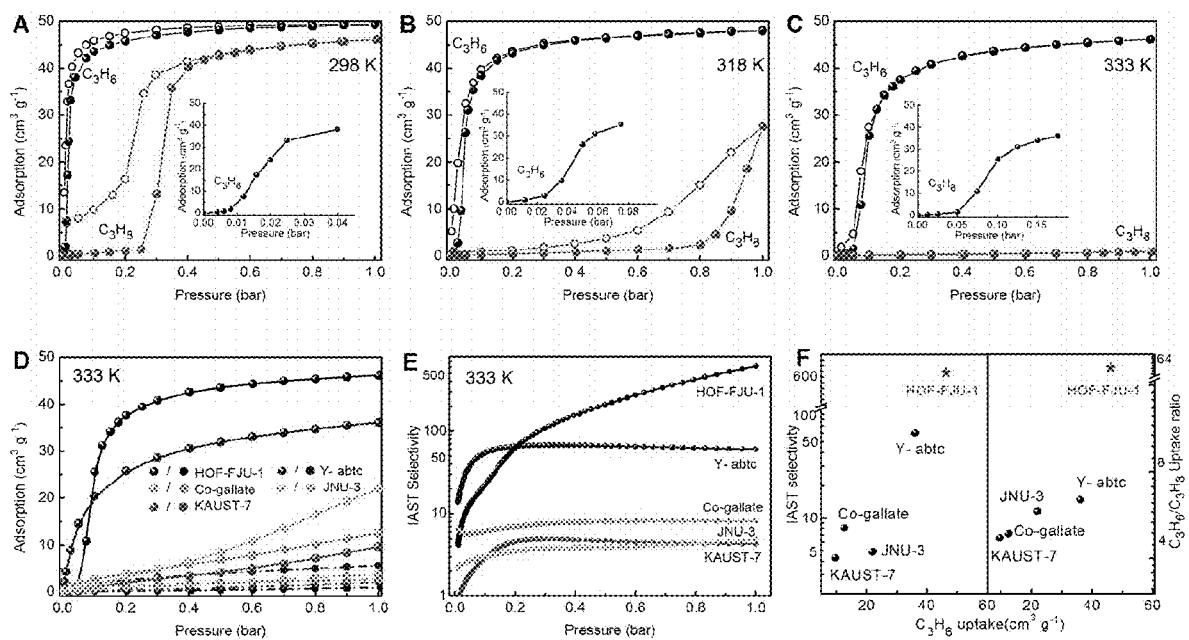
FIGS. 4A-4F: Single-component gas adsorption and ideal adsorbed solution theory (IAST) selectivities.
Figures 5A, 5B:
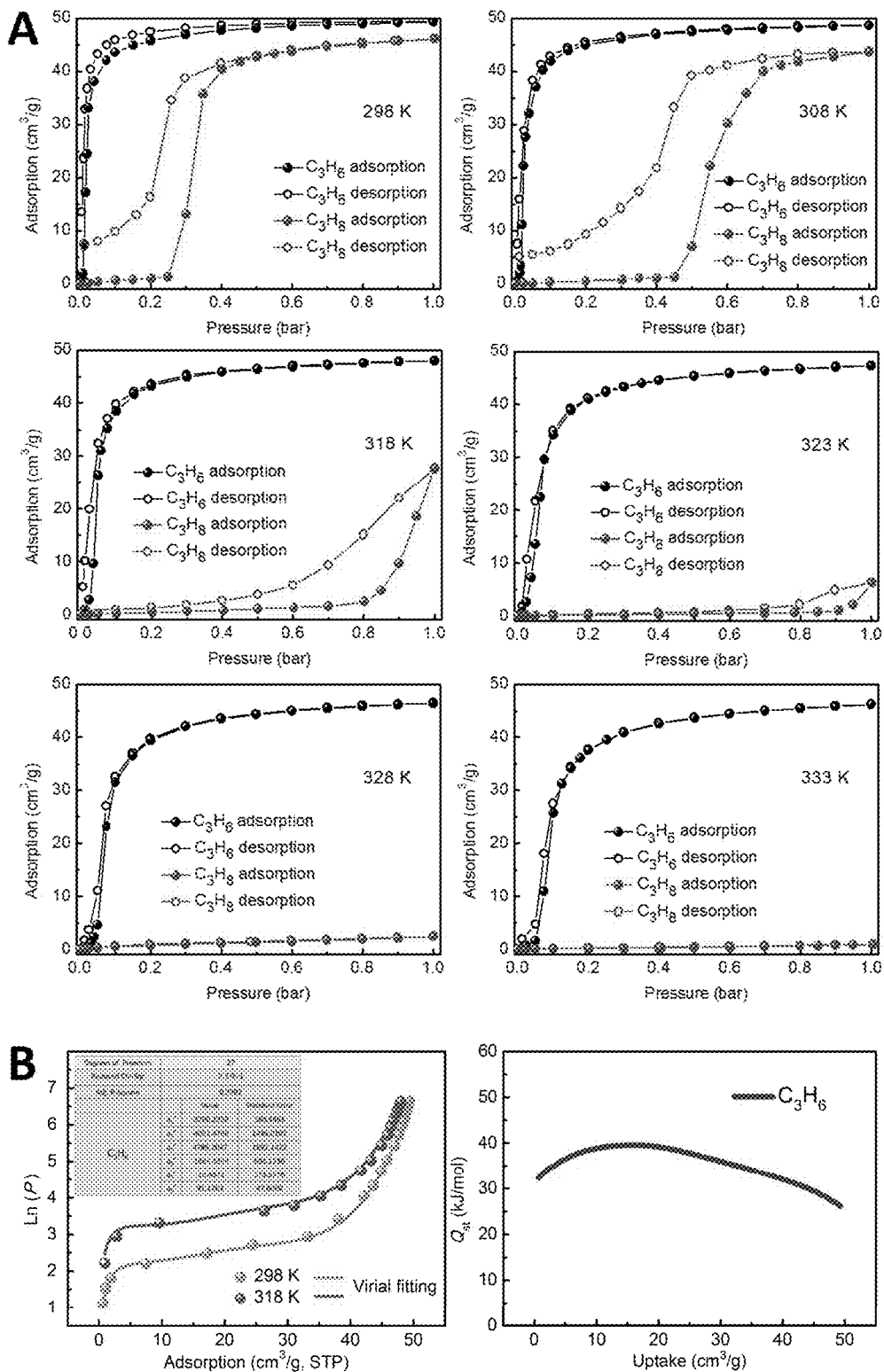
FIGS. 5A-5B: Adsorption isotherms and isosteric heats of HOF-FJU-1.
Figure 6A:
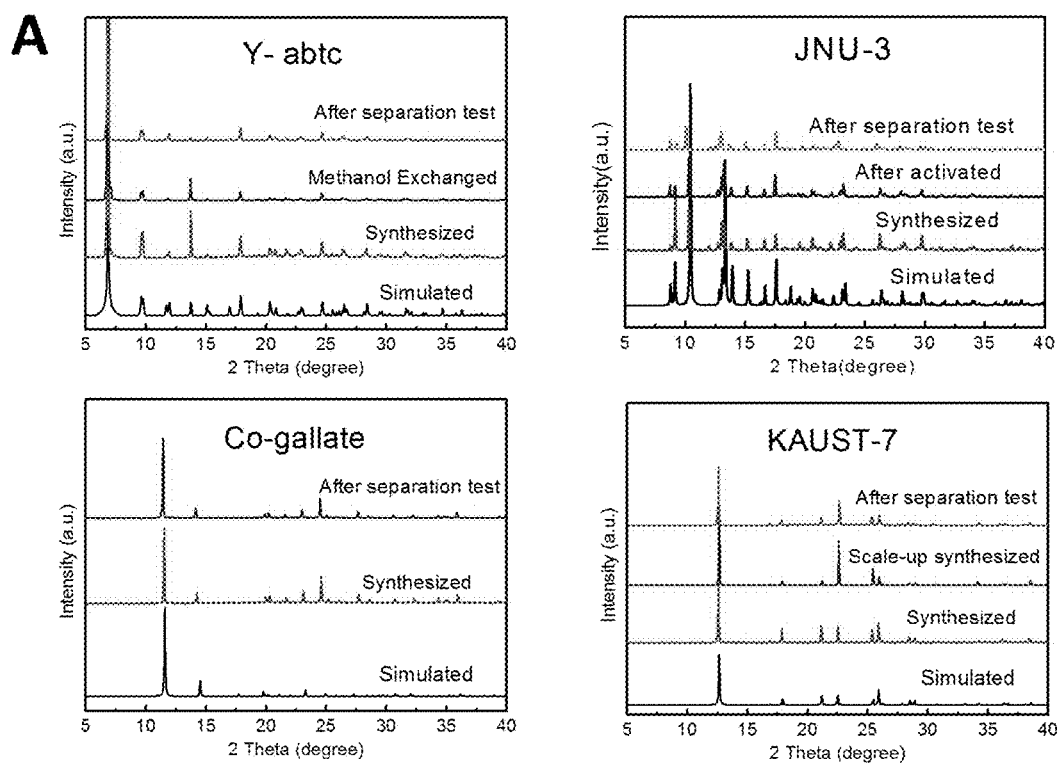
FIGS. 6A-6E: PXRD patterns and adsorption isotherms of Y-abtc, JNU-3, Co-gallate, and KAUST-7.
Figure 6B:
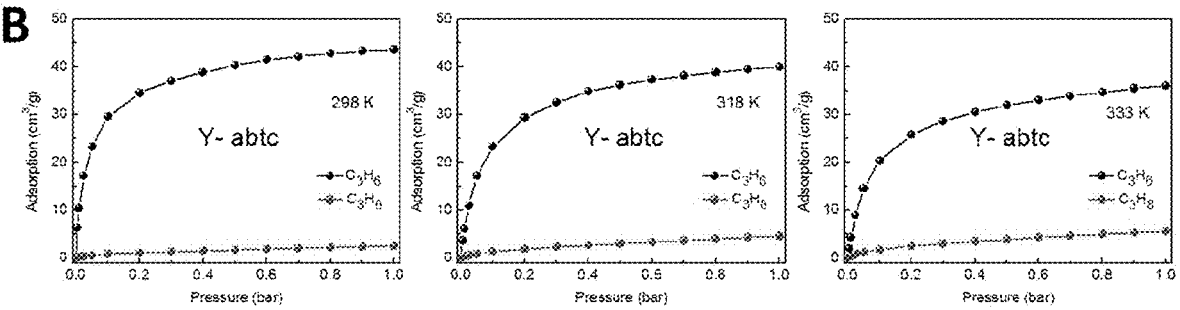
Figure 6C:
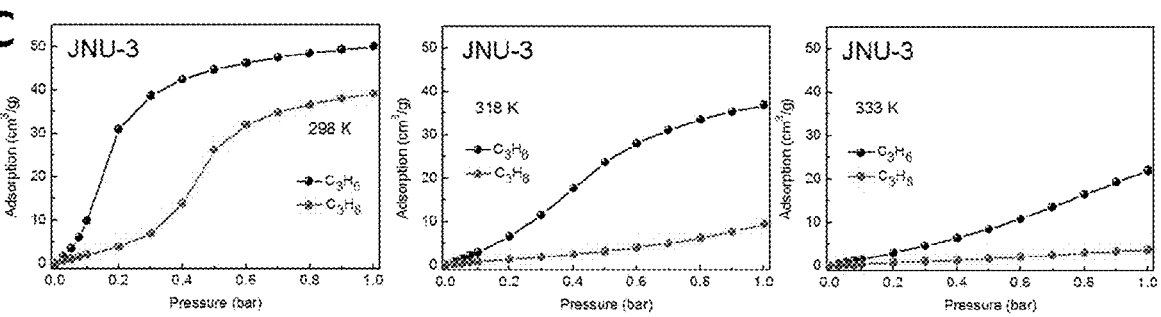
Figure 6D:
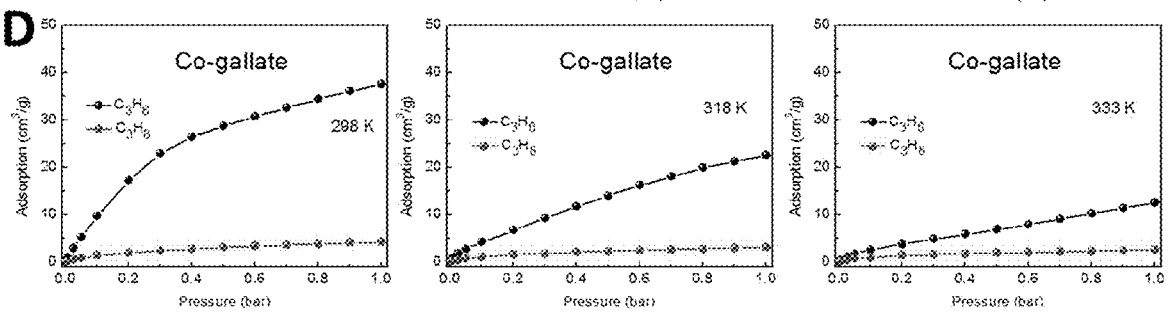
Figure 6E:
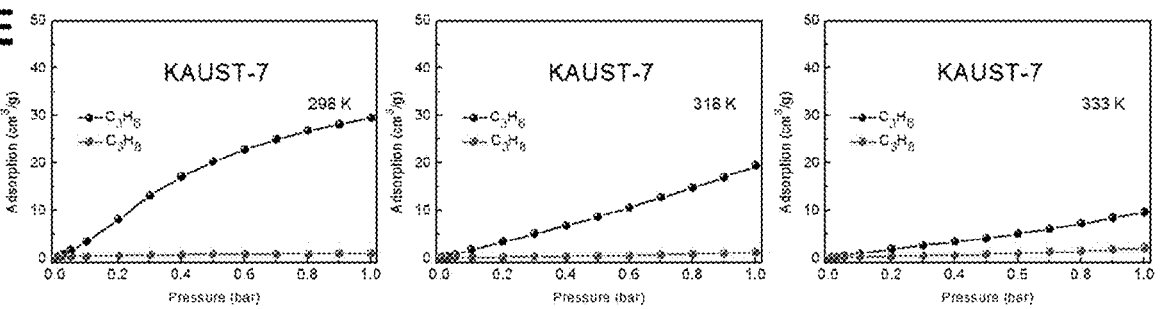

Pure component equilibrium sorption was measured to precisely determine the adsorption process of $C_3H_6$ and $C_3H_8$ in HOF-FJU-1 from 298 to 333 K and up to 1 bar (FIG. 4A to FIG. 4C and FIG. 5A). At 298 K, the $C_3H_6$ adsorption isotherm of HOF-FJU-1 exhibited a sharp increase at ultralow pressure (8 mbar). This implied, without being bound by theory, that at this pressure, the $C_3H_6$ molecules could overcome the steric hindrance and enter into the pore cavity of this HOF, leading to steady adsorption. When the pressure was increased to 0.1 bar, the adsorption of $C_3H_6$ rapidly reached approximate adsorption saturation at about 43.6 cm$^3$ g$^{-1}$, which corresponded to 88% adsorption saturation. Finally, at 1 bar and 298 K, the total $C_3H_6$ adsorption capacity on HOF-FJU-1 was determined at 49.3 cm$^3$ g$^{-1}$ (2.2 mmol g$^{-1}$), while the corresponding adsorption heat was calculated at 32.4 kJ mol$^{-1}$ (FIG. 5B). As expected, negligible adsorption of $C_3H_8$ (<1.5 cm$^3$ g$^{-1}$) was observed as a result of steric hindrance at dosing pressure below ~0.25 bar. Until the pressure increased to 0.3 bar, obvious adsorption occurred, and finally reaching 46.1 cm$^3$ g$^{-1}$ at 1 bar and 298 K. Subsequently, the temperature was gradually increased to 333 K. The gate-opening pressure of $C_3H_6$ slowly increased to 0.05 bar and 46.2 cm$^3$ g$^{-1}$ adsorption capacity was reached at 1 bar. It is noteworthy that at that point, the adsorption of $C_3H_8$ was impossible below the standard pressure (FIG. 4A to FIG. 4C). In the developed HOF, the variation in the gating pressure for $C_3H_8$ is significantly greater than that for $C_3H_6$ during the temperature increase. This intriguing phenomenon provided a valuable platform for regulating the adsorption and selectivity of $C_3H_6/C_3H_8$, eventually achieving complete sieving of $C_3H_6$ from $C_3H_8$.

Figures 7A, 7B, 7C, 7D, 7E:
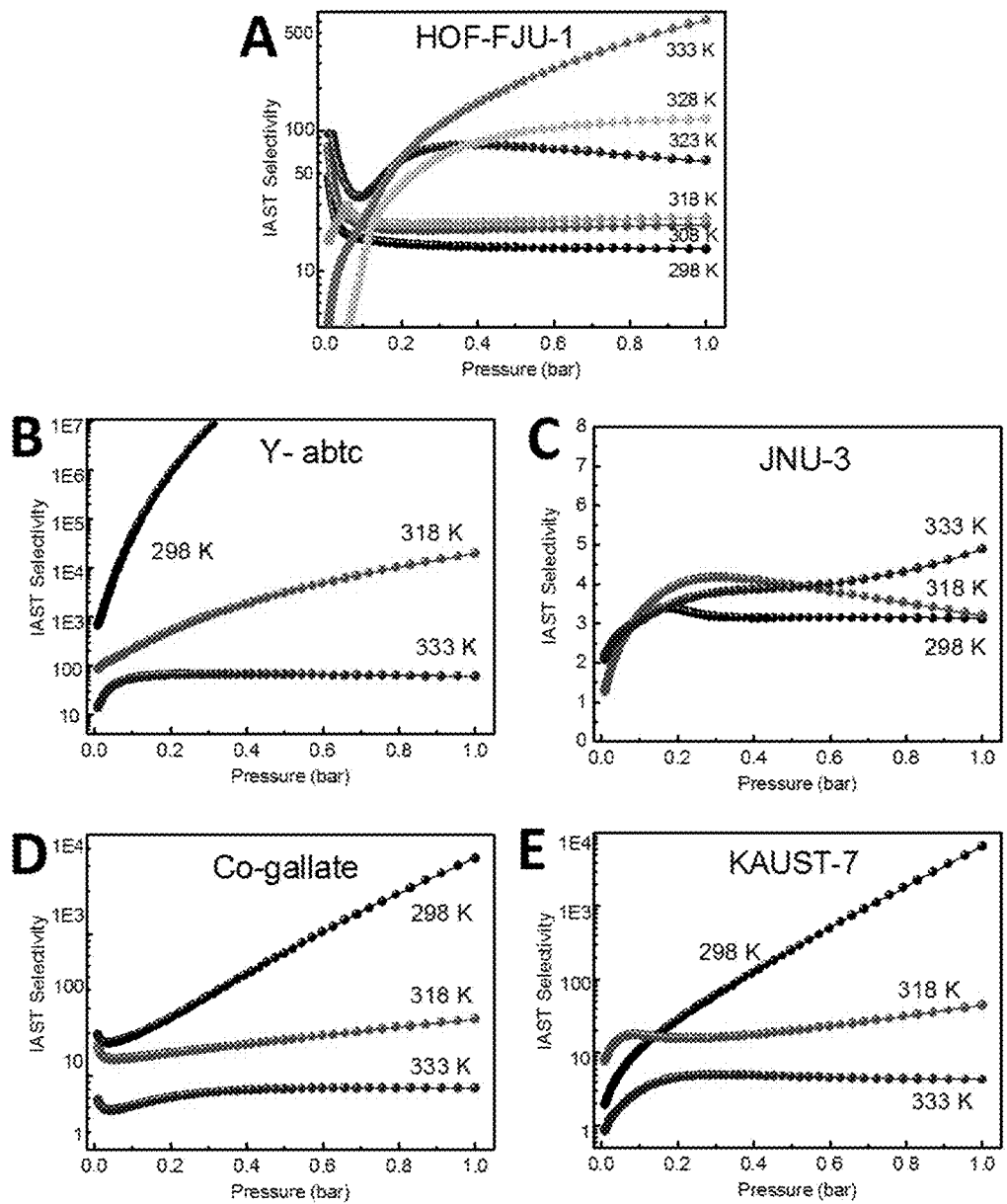
FIGS. 7A-7E: Calculated IAST selectivities of HOF-FJU-1, Y-abtc, JNU-3, Co-gallate, and KAUST-7.
Figure 8A:
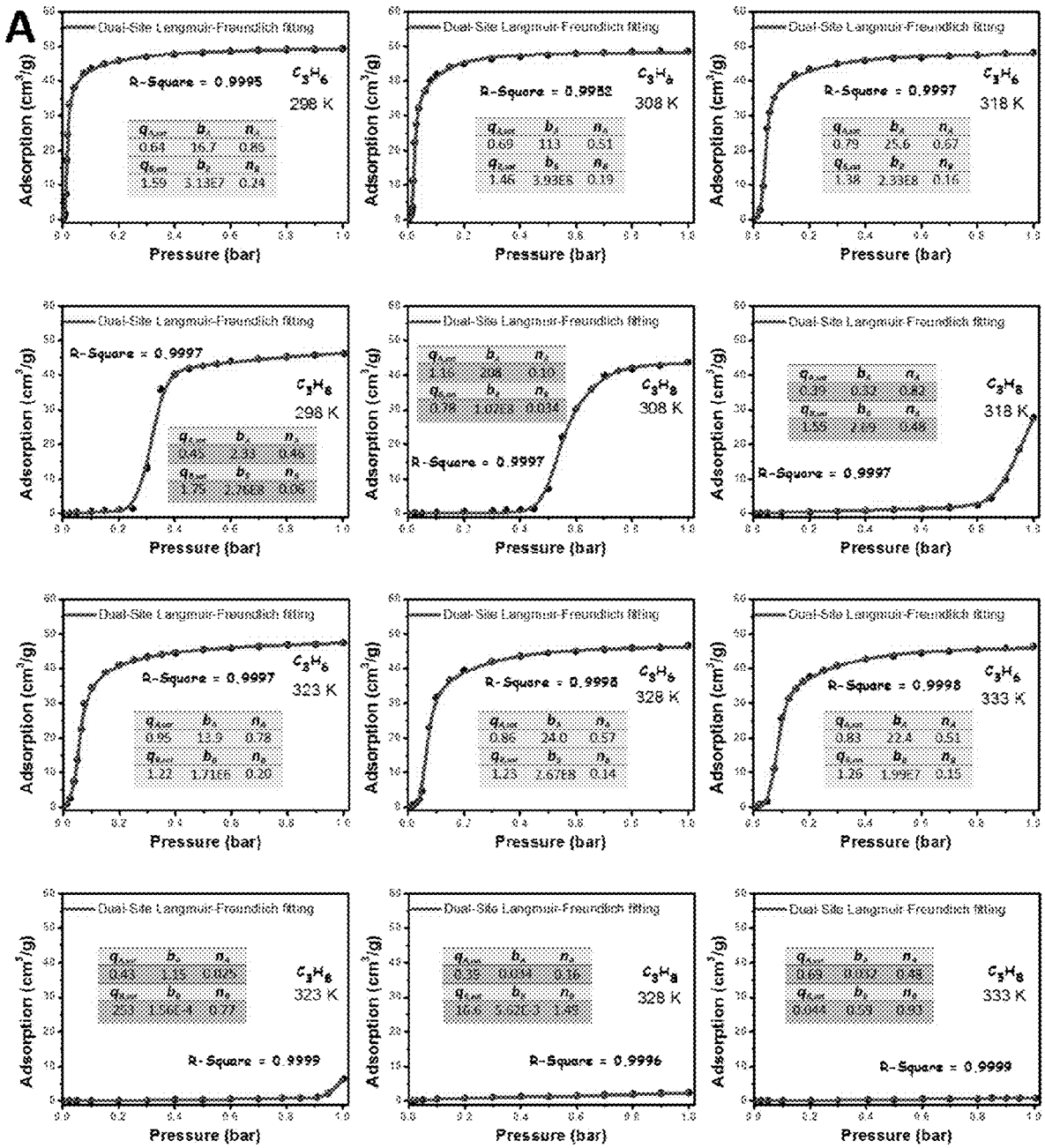
FIGS. 8A-8E: Simulated adsorption isotherms.
Figure 8B:
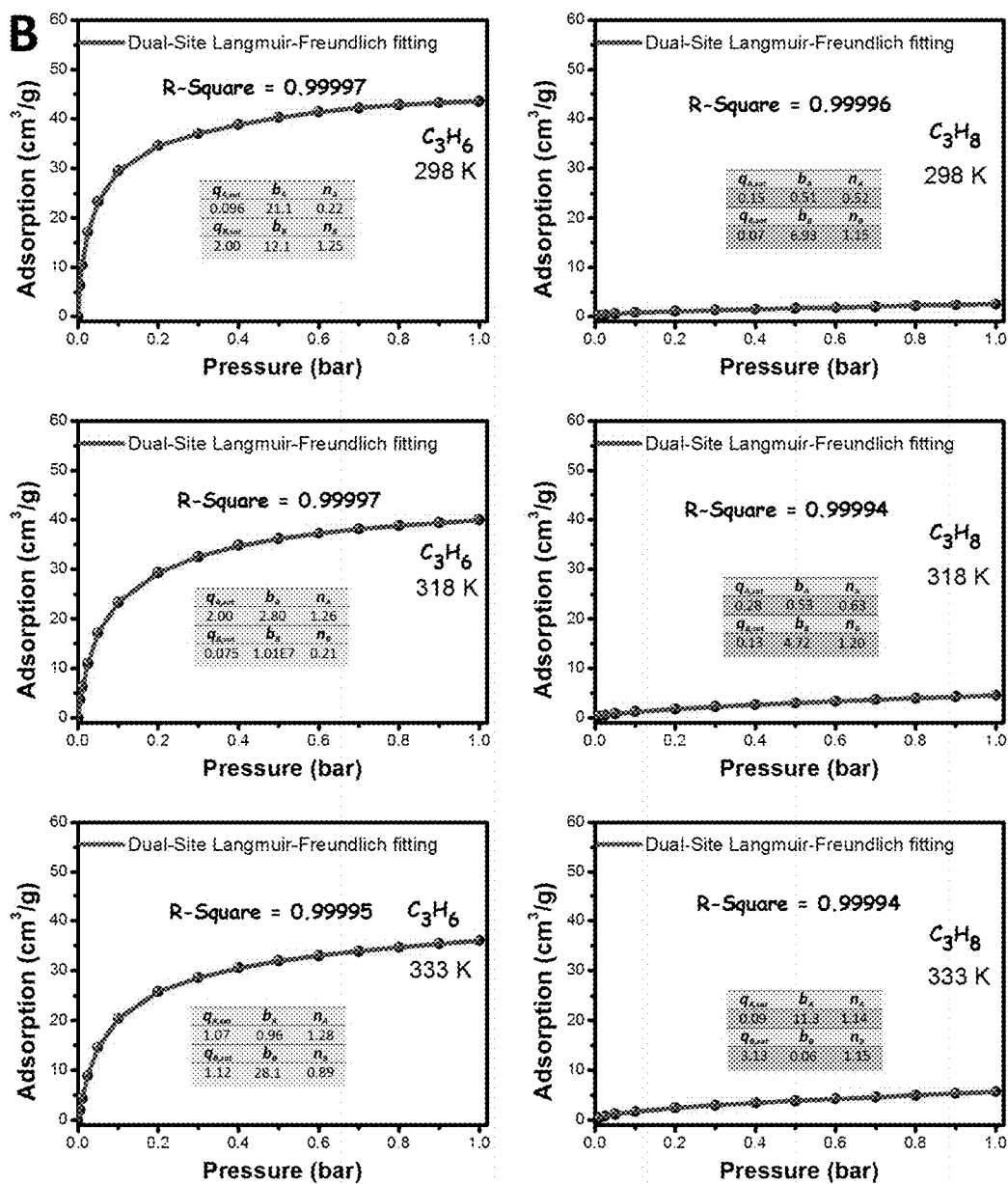
Figure 8C:
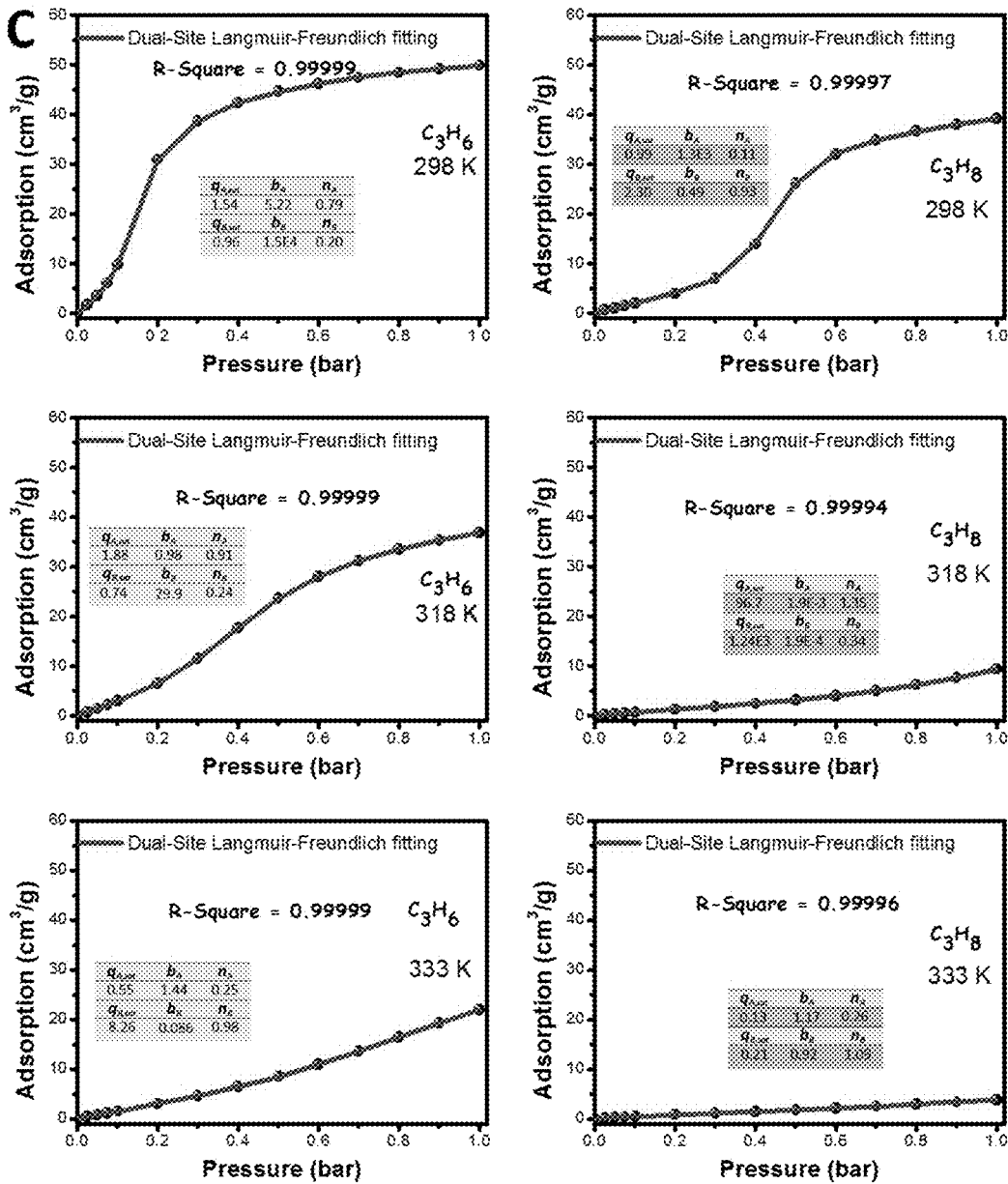
Figure 8D:
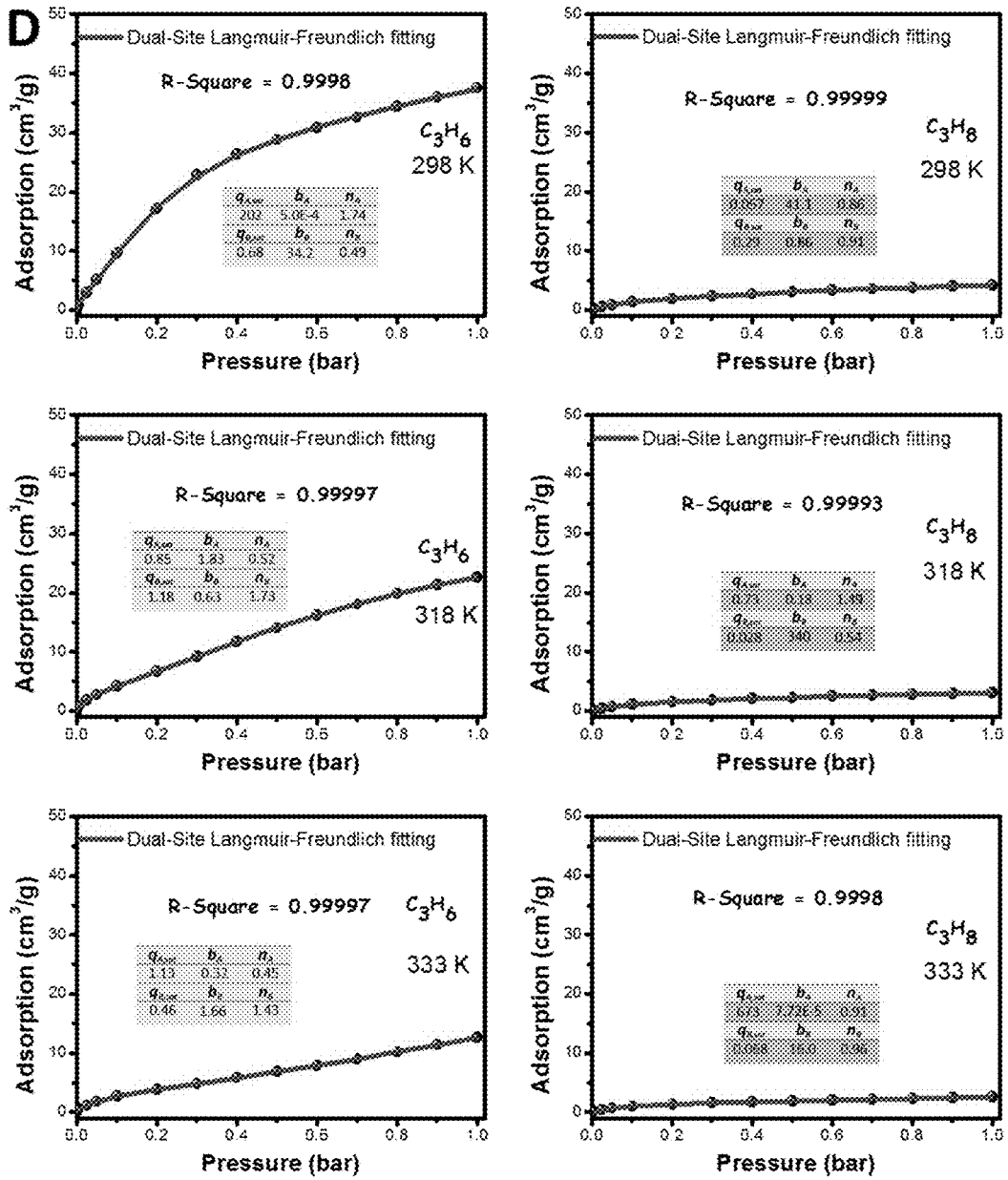
Figure 8E:
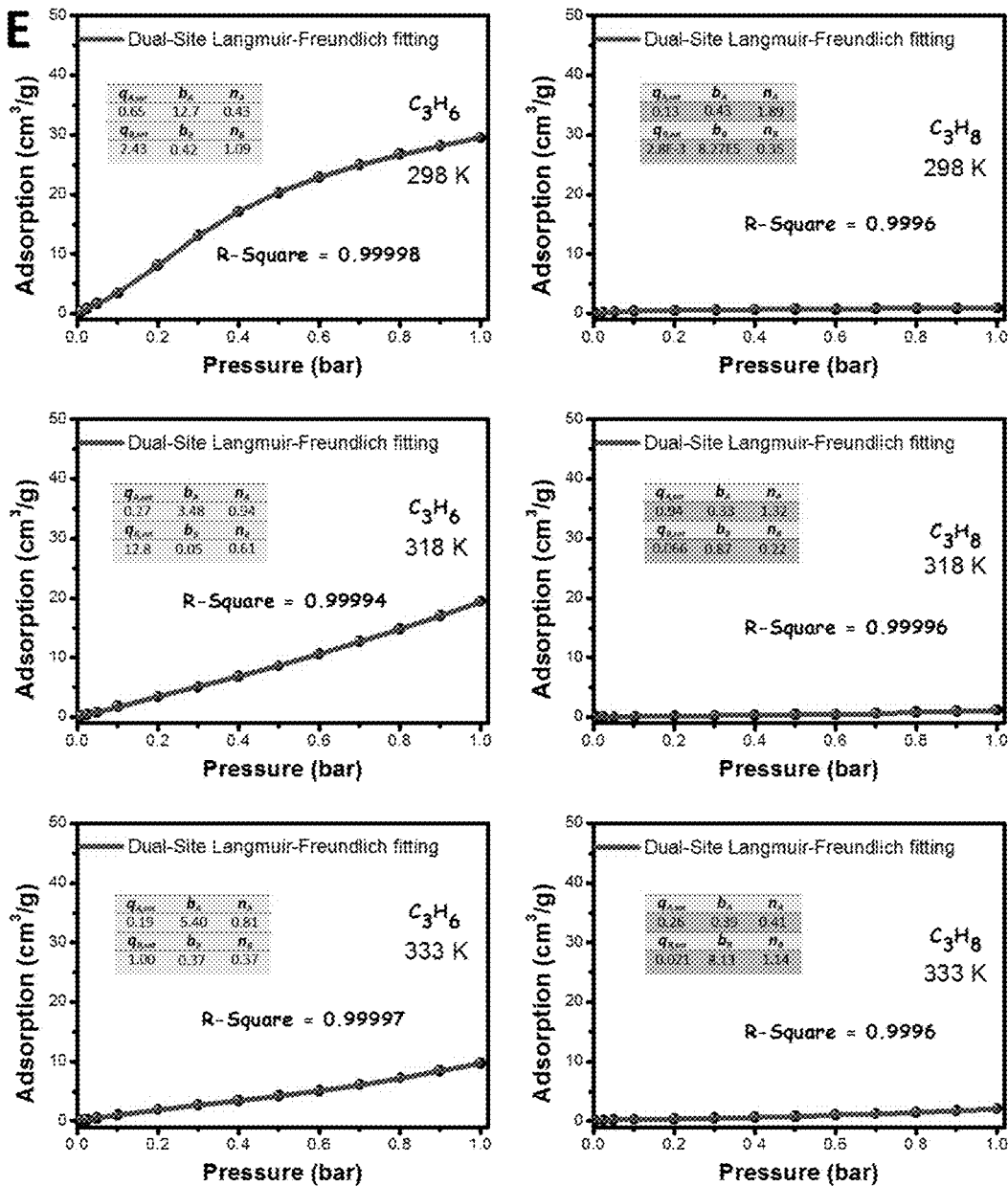

To compare HOF-FJU-1 with benchmark $C_3H_6$ molecular sieving materials (Y-abtc, JNU-3, Co-gallate, and KAUST-7), $C_3H_6$ and $C_3H_8$ adsorption was measured from 298 to 333 K (FIG. 4D and FIG. 6). Notably, as the temperature increased, the $C_3H_6/C_3H_8$ adsorption ratio and IAST selectivity of $C_3H_6/C_3H_8$ (50/50) on HOF-FJU-1 significantly increased (FIG. 7 and FIG. 8). This trend was evidently different from those observed for traditional rigid $C_3H_6$ sieving materials. In typical sieving materials, such as Y-abtc, KAUST-7, the diffusion and adsorption of weak adsorbates is enhanced at high temperatures, while the adsorption capacity of $C_3H_6$ decreased significantly; thus, the sieving effect is considerably weakened. Unexpectedly, the somewhat flexible nature of HOF-FJU-1 enabled complete $C_3H_6$ separation with a high diffusion rate at high temperatures, which is more favorable in industrial production processes. It was found that at 333 K and 1 bar, HOF-FJU-1 exhibited by far the highest $C_3H_6/C_3H_8$ uptake ratio (53) and $C_3H_6/C_3H_8$ (50/50) selectivity (616) compared to Y-abtc (60), JNU-3 (4.9), Co-gallate (8.1) and KAUST-7 (4.3) at the same conditions (FIG. 4E and FIG. 4F). Hence, HOF-FJU-1 developed in this study is a remarkably promising material for efficient $C_3H_6/C_3H_8$ separation.

Figures 9A, 9B, 9C, 9D:
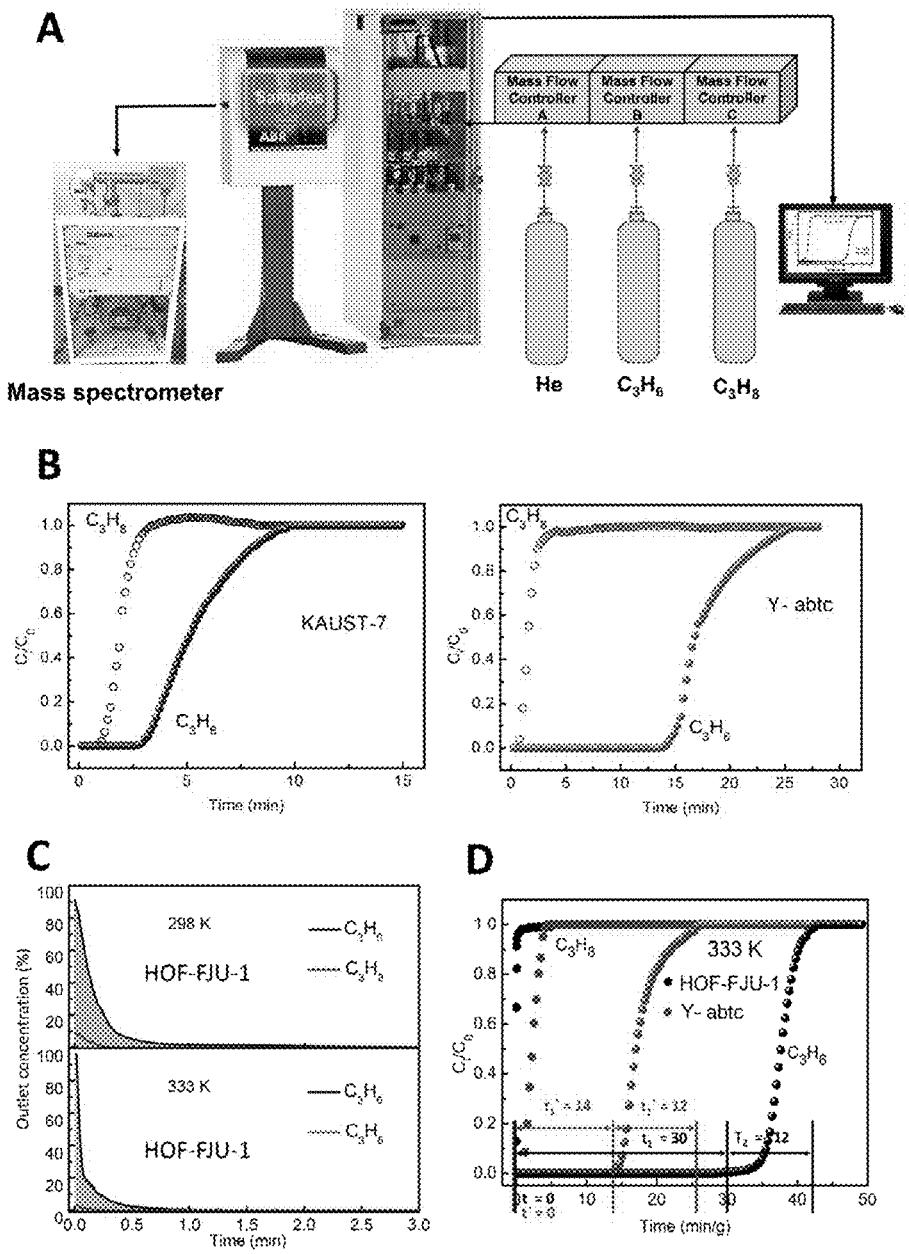
FIGS. 9A-9D: Breakthrough experiments.
Figures 10A, 10B, 10C, 10D, 10E, 10F:
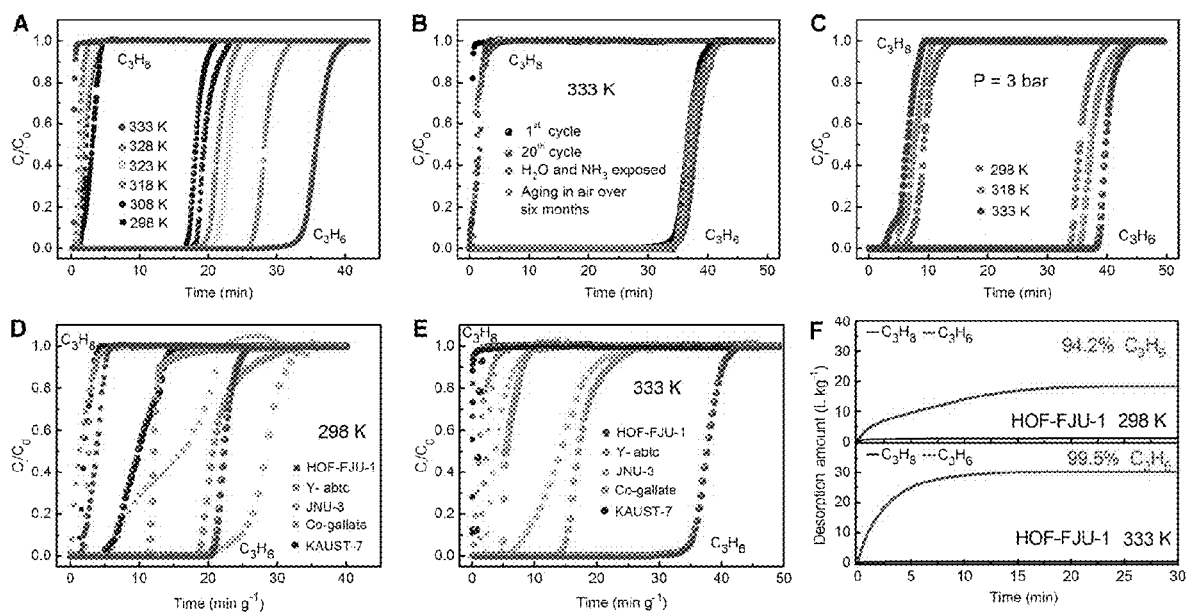
FIGS. 10A-10F: Breakthrough and desorption curves.

In the industry, the primary processes for the production of $C_3H_6$ include naphtha cracking and $C_3H_8$ dehydrogenation. The conversion yields of these reactions are in the range of 50-60% (H. Wang et al, 2018), and equimolar mixtures of $C_3H_6$ and $C_3H_8$ are obtained in the feed gas flow. Hence, enrichment of $C_3H_6$ from $C_3H_6/C_3H_8$ mixtures is a crucial step, which must be conducted prior to further utilization. To evaluate the $C_3H_6$ separation performance of HOF-FJU-1, fixed-bed breakthrough tests were performed at 298-333 K. During these experiments, the mixture of $C_3H_6/C_3H_8$ (50/50, v/v) was passed through a column packed with activated HOF-FJU-1 at a total flow rate of 2 mL min$^{-1}$ at different temperatures (FIG. 9). As shown in FIG. 10A, $C_3H_8$ rapidly passed through the packed column and reached equilibrium with undetectable $C_3H_6$ in the flowing gas (detection limit 0.01%). Subsequently, $C_3H_6$ eluted and rapidly achieved the concentration of feed gas. Notably, the $C_3H_8$ adsorption decreased, while the $C_3H_6$ adsorption increased with increasing temperature up to 333 K. Eventually, $C_3H_8$ rapidly eluted at the initial stage, whereas $C_3H_6$ was detected after a long retention time of >30 min. The main reason for these observations was the fact that higher temperatures dramatically improved the diffusion of $C_3H_6$ in the developed HOF material. Concurrently, $C_3H_8$ experienced higher adsorption hindrance. Thus, a highly selective separation of $C_3H_6/C_3H_8$ was achieved. In addition, the full regeneration was complete in 2 min, indicating a fast desorption rate of HOF-FJU-1 (FIG. 9C). Importantly, the developed material differs from traditional flexible MOFs (Krause et al, 2020). Specifically, the partial motion and flexibility remain stable, i.e., HOF-FJU-1 was shown to largely retain the $C_3H_6$ sieving separation performance and productivity even under harsh conditions, which was evidenced by the results of the multiple breakthrough experiments (FIG. 10B). Moreover, to meet the industrial demand for large production capacity, selective separation of $C_3H_6$ on HOF-FJU-1 was performed at 3 bar and different temperatures. As demonstrated in FIG. 10C, HOF-FJU-1 displayed excellent separation performance for the $C_3H_6/C_3H_8$ (50/50) mixture at a moderate pressure. Pleasingly, the material retained high capture capacities (4.8-5.4 mol kg$^{-1}$) at a wide temperature range (298-333 K).

However, this unique thermoregulatory gating effect was not observed in the previously reported three $C_3H_6$ sieving materials, i.e., Y-abtc, Co-gallate, and KAUST-7. An increase in the temperature led to a significant decrease in their separation productivities (FIG. 10D, FIG. 10E, and FIG. 9B). Overall, the separation performance of HOF-FJU-1 was noticeably better than that of Co-gallate and KAUST-7, and resembled the performance of Y-abtc at 298 K. Although JNU-3 has a similar thermoregulatory gating phenomenon, the selectivity is poor at low temperature (298 K), the adsorption capacity is significantly reduced at high temperature (333 K), and the separation performance loss is obvious. Nevertheless, at 333 K, the $C_3H_6/C_3H_8$ separation performance of HOF-FJU-1 considerably increased, significantly higher than that of Y-abtc, JNU-3, Co-gallate, and KAUST-7. Based on the breakthrough curves at 333 K (FIG. 9D), the amount of $C_3H_6$ captured from an equimolar $C_3H_6/C_3H_8$ mixture using HOF-FJU-1 was calculated at 1.58 mol kg$^{-1}$, which was more than two times higher than that of the materials Y-abtc (0.72 mol kg$^{-1}$), JNU-3 (0.63 mol kg$^{-1}$), Co-gallate (0.26 mol kg$^{-1}$), and KAUST-7 (0.054 mol kg$^{-1}$). Under the dynamic conditions, the corresponding $C_3H_6/C_3H_8$ selectivity of HOF-FJU-1 at 333 K was established at 65.8, which was also considerably higher than those of Y-abtc (15.3), JNU-3 (4.7), Co-gallate (2.8), and KAUST-7 (2.2).

Figures 11A, 11B, 11C, 11D, 11E, 11F:
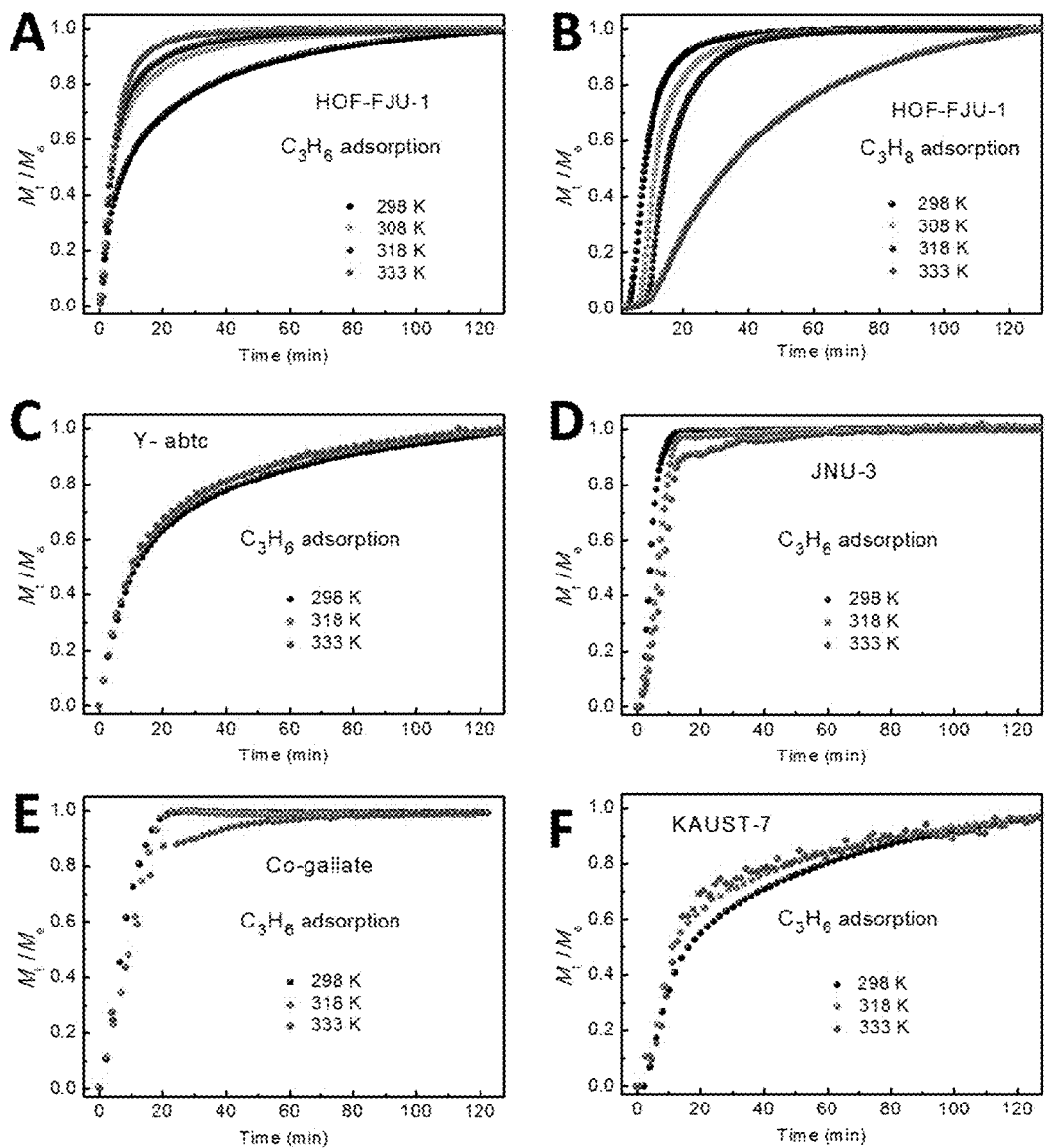
FIGS. 11A-11F: Kinetic adsorption curves.

To gain better understanding of the effect of increasing temperature on the separation ability, the kinetic adsorption on these three materials was subsequently investigated in detail (FIG. 11). Remarkably, the $C_3H_6$ adsorption rate of HOF-FJU-1 became faster with an increase in temperature. In contrast, an opposite trend was determined for the adsorption of $C_3H_8$, which indicated that under the same conditions, higher temperature accelerated the diffusion of $C_3H_6$, but raised the barrier for the adsorption of $C_3H_8$. Moreover, the adsorption rate did not change significantly in the case of Y-abtc, JNU-3, Co-gallate, and KAUST-7; however, the equilibrium adsorption capacity evidently decreased at high temperature. This may attribute to their over strong host-guest interactions reflected in the high $C_3H_6$ adsorption heat ($\geq 50$ kJ mol$^{-1}$) (Cadiau et al, 2016; Wang et al, 2018). Therefore, HOF-FJU-1 exhibited the fastest adsorption equilibrium rate among the analyzed $C_3H_6$ sieving materials at 318-333 K, owing to its unique temperature-responsive gating effect.

Figures 12A, 12B:
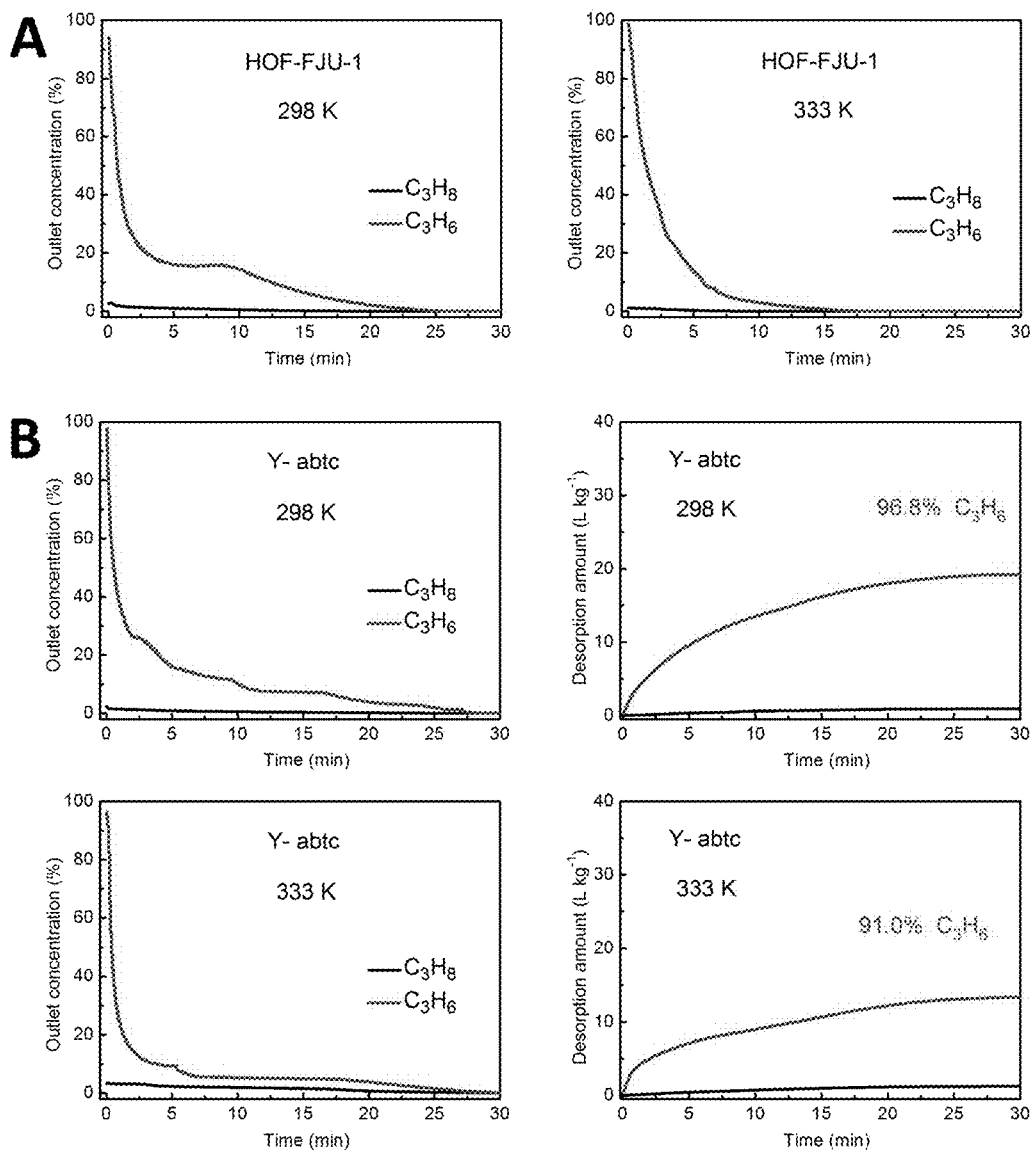
FIGS. 12A-12E: Desorption and regeneration process.
Figures 12C, 12D:
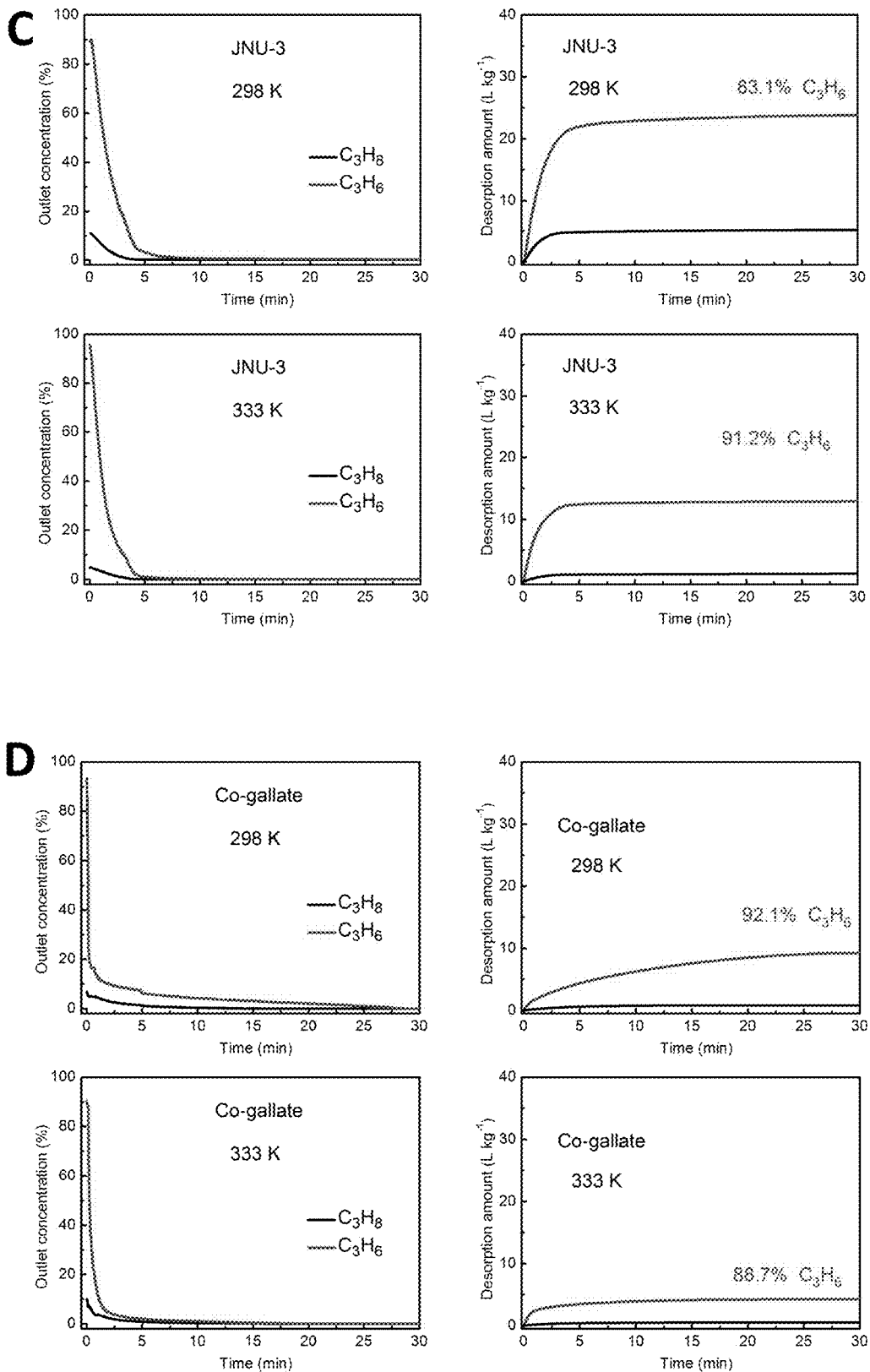
Figure 12E:
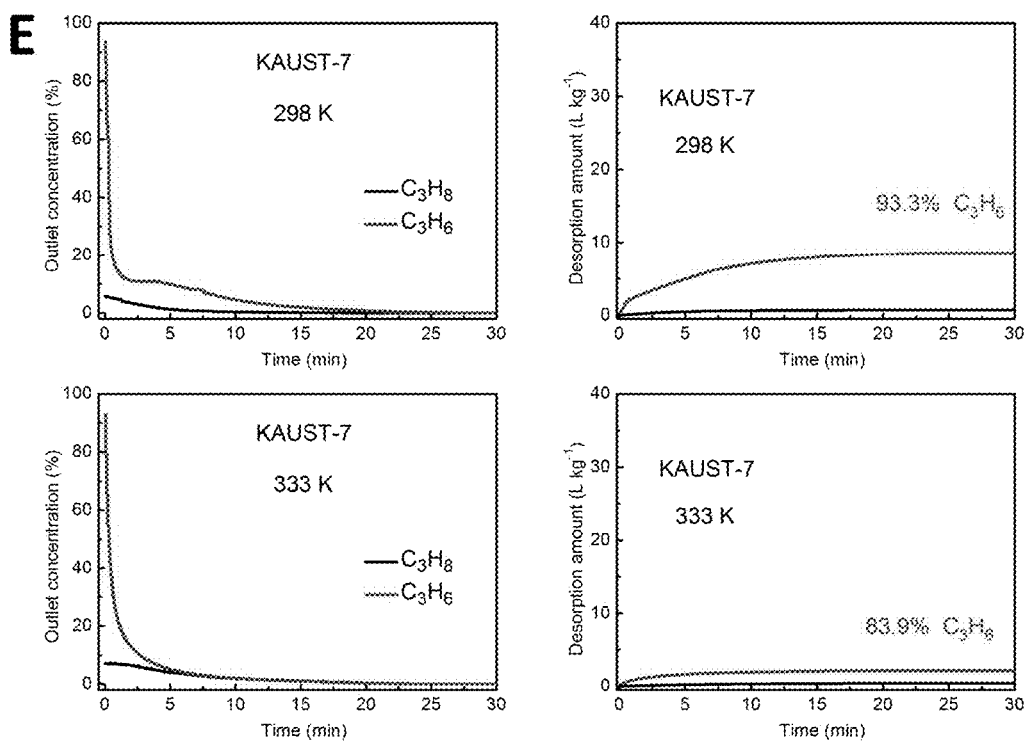

To evaluate the feasibility of employing HOF-FJU-1 as an efficient separating agent for the production of high purity $C_3H_6$, the subsequent regeneration experiments involved using HOF-FJU-1, Y-abtc, JNU-3, Co-gallate, and KAUST-7 under the same conditions. When method of vacuuming was used to regenerate the saturated column loaded with HOF-FJU-1, $C_3H_6$ with 94.2% (298 K) and 99.5% (333 K) purity was obtained at the outlet (FIG. 10F and FIG. 12A). The corresponding $C_3H_6$ productivities were determined at 18.1 and 30.2 L kg$^{-1}$ of adsorbent under standard conditions. It is noteworthy that at 333 K, HOF-FJU-1 exhibited notably higher $C_3H_6$ productivity than Y-abtc, JNU-3, Co-gallate, and KAUST-7, which have been reported as molecular sieving materials with the best performance for $C_3H_6/C_3H_8$ separation. They were shown to display $C_3H_6$ productivities of 12.8, 13.3, 4.2, and 2.1 L kg$^{-1}$ of adsorbent under the same conditions, respectively (FIG. 12B and FIG. 12C).

Figures 13A, 13B, 13C, 13D, 13E, 13F:
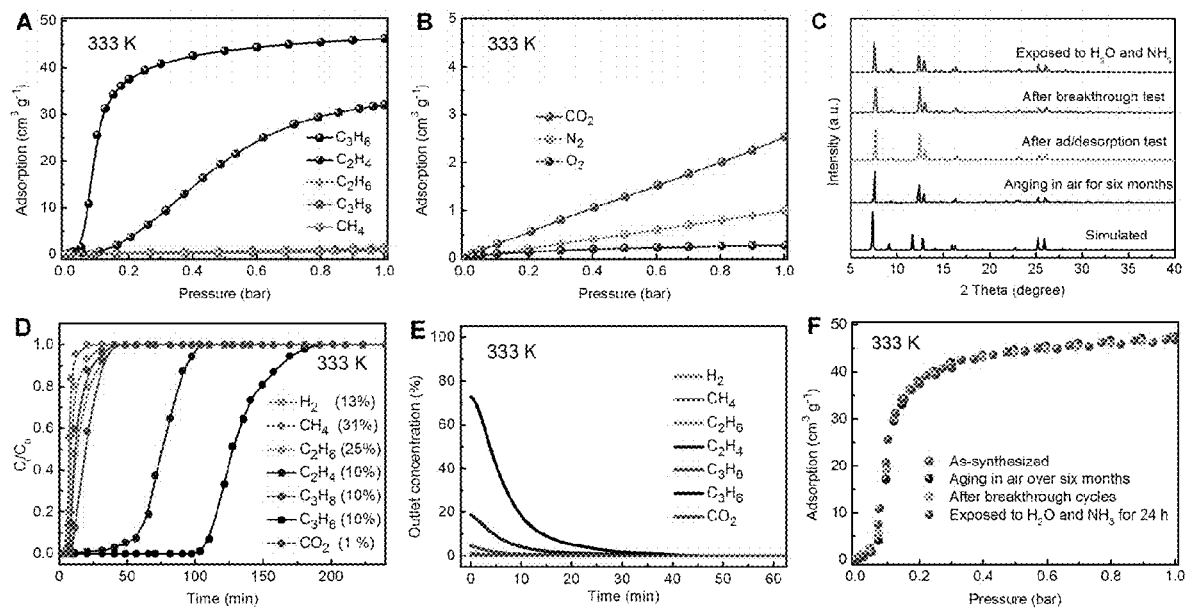
FIGS. 13A-13F: Multi-component breakthrough and stability of HOF-FJU-1.

In real production processes, the feed gas also contains various other components, which is a big challenge in the separation of $C_3H_6$ from refinery gas. In the first instance, the single-component adsorption of several substances was investigated (i.e., $CH_4$, $C_2H_4$, $C_2H_6$, $C_3H_6$, and $C_3H_8$) as well as common gas impurities (i.e., $CO_2$, $N_2$, and $O_2$) at 333 K. As it can be seen in FIG. 13A and FIG. 13B, the majority of the gas components were not adsorbed on HOF-FJU-1, with the exception of $C_3H_6$, $C_2H_4$, and some $CO_2$. Hence, it was demonstrated that the material developed in this study displayed excellent adsorption selectivity for $C_3H_6$. Subsequently, the separation experiment was performed using a gas mixture of $CH_4/C_2H_4/C_2H_6/C_3H_6/C_3H_8/CO_2/H_2$ (31/10/25/10/10/1/13, v/v/v/v/v/v/v) to simulate the recovery of $C_3H_6$ from refinery gas. As shown in FIG. 13D, most of the gas impurities eluted through the column at the very beginning, before the successive elution of the more commercially valuable $C_2H_4$ and $C_3H_6$. During the regeneration process by He flushing, 10% $C_3H_6$ could be enriched even up to about 72% in just one separation cycle (FIG. 13E).

Furthermore, stability of HOF-FJU-1 upon exposure to air, $H_2O$ and $NH_3$ was investigated by monitoring the PXRD patterns under various conditions (FIG. 13C). Evidently, no loss of crystallinity or phase change was observed during the exposure of the material to air over six months or under a $H_2O/NH_3$ (25 wt %) atmosphere. Both PXRD and gas sorption analyses confirmed that HOF-FJU-1 exhibited remarkable structural stability (FIG. 13F), which makes it a promising material for real separation applications.

Example 3: Materials and Methods

A. Materials

All reagents and solvents were directly used without further purification. 3,3',6,6'-tetracyano-9,9'-bicarbazole was obtained by our previous work (Y. Yang et al, 2021), 5-(3-methyl-5(pyridin-4-yl)-4H-1,4-triazol-4-yl)-1,3-benzenedicarboxylic acid (98%), and 3,3',5,5'-azobenzene tetracarboxylic acid (98%) were obtained by Jilin Chinese Academy of Sciences-Yanshen Technology Co., Ltd (China). Pyrazine (99%), Gallic acid monohydrate (98%), $Y(NO_3)_3 \cdot 5H_2O$ (99.9%), $Ni(NO_3)_2 \cdot 6H_2O$ (99%), $CoCl_2 \cdot 6H_2O$ (98%), $Co(NO_3)_2 \cdot 6H_2O$ (98%), $Nb_2O_5$ (99.9%), KOH (95%), HFaq (49%) and N,N'-dimethylacetamide (DMA) were purchased from Aladdin Reagent Co. Ltd. Ammonia solution ($NH_3 \cdot H_2O$, 25%), N,N'-dimethylformamide (DMF), methanol, and ethanol were obtained from Sinopharm Group Chemical Reagent Co., Ltd. The deionized water was purified by using a Millipore Elix Advantage 3 purification system.

The purities of propylene, propane, ethylene and ethane were higher than 99.99%. The purities of methane, carbon dioxide, nitrogen and oxygen were higher than 99.999%. All the pure gases and mixed gas $CH_4/C_2H_4/C_2H_6/C_3H_6/C_3H_8/CO_2/H_2$ (31/10/25/10/10/1/13, v/v/v/v/v/v/v) were purchased from Dining Xieli Special Gas Co., Ltd.

B. Synthesis of Selected MOFs

The preparation and activation of Y-abtc, JNU-3, Co-gallate, and KAUST-7 were according to the previous reports (Wang et al, 2018; Zeng et al, 2021; Liang et al, 2020; Cadiau et al, 2016). PXRD patterns in FIG. 6 verified that the MOFs materials had good crystallinity and purity.

C. Crystallization of HOF-FJU-1

The organic building block 3,3',6,6'-tetracyano-9,9'-bicarbazole (0.21 g, 0.48 mmol) was dissolved in DMF (5 mL) under 413 K at a small glass-vial for one hour. The resulting solution was cooled to room temperature (298 K). The bottle was then kept at room temperature for 12 h. Colorless needle-like crystals were obtained.

D. Stability Test of HOF-FJU-1

The chemical stability of HOF-FJU-1 was investigated as follows: HOF-FJU-1 sample was exposed to air at room temperature for 6 months, or HOF-FJU-1 was exposed to the steam environment of ammonia solution (25% wt) for 24 h. PXRD patterns and $C_3H_6$ adsorption of HOF-FJU-1 treated under different conditions or after breakthrough tests were coincided with the pristine sample, indicating HOF-FJU-1 had great structural stability.

E. SCXRD for $C_3H_6$-Loaded HOF-FJU-1

The single crystal of HOF-FJU-1 was fixed inside a glass capillary and pretreated in a manner similar to the gas adsorption measurement to obtain the guest-free HOF-FJU-1. After the single-crystal data collection for guest-free HOF-FJU-1 in $N_2$ atmosphere, the capillary with one open end was placed in a desiccator to backfill with $C_3H_6$ for 12 hours to obtain the gas loaded single crystal. The desiccator was filled with $C_3H_6$ through ASAP 2020, and the pressure inside the desiccator was measured to be 1 atm. The capillary was then sealed by plasticine and kept at 150 K during data collection for $C_3H_6$-loaded HOF-FJU-1. The detailed crystallographic data and structure refinement parameters for the compound are summarized in Table 1.

F. Characterization

The crystallinity and phase purity of the materials were checked by powder X-ray diffraction (PXRD) on a Bruker D8 ADVANCE X-ray diffractometer with Cu-Kα (λ=1.54184 Å) radiation operated at 40 kV and 40 mA. Scanning was performed over the 2θ range of 5-40° at 4° min$^{-1}$. The single-crystal X-ray was performed with Agilent Technologies SuperNova A diffractometer and the structure was solved with the ShelXT structure solution program using intrinsic phasing and refined with the SHELXT refinement package using least-squares minimization. N2 and Ar adsorption/desorption isotherms were obtained using an ASAP2020 Plus HD88 analyzer at 77 K and 87 K, respectively.

G. Adsorption and Breakthrough Experiments

Adsorption isotherms were collected with an Intelligent Gravimetric Analyser (IGA 001, Hiden, UK, detection limit 0.1 μg based on ultra-high-precision microbalance). HOF-FJU-1 samples were activated under high vacuum (10$^{-6}$ bar) at 150° C. overnight or until no further weight loss was observed. Adsorption equilibrium data was collected once a stable pressure (more than adsorption points were recorded from 0 to 1 bar) and weight was maintained for at least 30 min to reach an adsorption equilibrium at each point along the isotherm. For each adsorption test, the mass of the preactivated materials is about 80 mg. The breakthrough experiments for $C_3H_6/C_3H_8$ (50/50, v/v) mixtures were carried out at ABR (Hiden, UK) with a flow rate of 2 mL min$^{-1}$ at temperatures of 298 to 333 K, pressures of 1 bar and 3 bar. In the separation experiment, samples were packed into Φ 6×80 mm packed column, and the column was heated under reduced pressure before testing (sample mass: HOF-FJU-1, 0.95 g; Y-abtc, 1.08 g; JNU-3, 1.12 g; Co-gallate, 1.09 g; KAUST-7, 1.12 g). In the desorption process, samples were activated at vacuum (1×10$^{-6}$ bar) or by flushing the adsorption bed with helium (50 mL min$^{-1}$) for 30 min at 333 K.

H. Fitting of Pure Component Isotherms

To calculate the $C_3H_6/C_3H_8$ adsorption selectivity for HOF-FJU-1 and selected MOFs at temperature from 298 K to 333 K, pure component isotherms were fitted with Dual-site Langmuir-Freundlich model.

$$q = q_{A,sat} \frac{b_A p^{1/nA}}{1 + b_A p^{1/nA}} + q_{B,sat} \frac{b_B p^{1/nB}}{1 + b_B p^{1/nB}} \quad (1)$$

where $q_A$,sat and $q_B$,sat (mol kg$^{-1}$) are the saturated capacities of sites A and B, respectively, bA and bB (1/kPa) are the affinity coefficients to the sites A and B, respectively, p (kPa) is the pressure of the bulk gas at equilibrium with the adsorbed phase (kPa), q (mol kg$^{-1}$) is the gas uptake amount of an adsorbent, and nA and nB represent the deviations from an ideal homogeneous surface.

The fitting parameters for $C_3H_6$ and $C_3H_8$ are provided in FIG. 8 presents a comparison of experimental data for adsorption isotherms $C_3H_6$ and $C_3H_8$ with Dual-site Langmuir model fits. The fits are of good accuracy for both guest molecules.

J. IAST Calculations of Adsorption Selectivity

In order to compare the $C_3H_6/C_3H_8$ separation potential of HOF-FJU-1 and selected MOFs, IAST calculations for the mixture of $C_3H_6/C_3H_8$ (50/50) were performed at different temperatures. For separation of a binary mixture of components A and B, the adsorption selectivity is defined by $$S_{ads} = \frac{q_A/q_B}{y_A/y_B} \quad (2)$$

where the $q_A$, and $q_B$ represent the molar loadings within the MOF that is in equilibrium with a bulk fluid mixture with mole fractions $y_A$, and $y_B=1-y_A$. The molar loadings, also called gravimetric uptake capacities, are usually expressed with the units mol kg$^{-1}$. The IAST calculations of $C_3H_6/C_3H_8$ adsorption selectivites taking the mole fractions $y_A=0.01$ and $y_B=1-y_A=0.99$ for a total pressure of 1 bar.

K. Calculation for Captured Amount of $C_3H_6$ and $C_3H_8$

The calculation for captured amount of $C_3H_6$ during the breakthrough process (FIG. 9D) in HOF-FJU-1, Y-abtc, JNU-3, Co-gallate, and KAUST-7 is defined by (Lin et al, 2018)

$$Q_{max} = q \int_0^\infty [c_i^0 - c_i(t)] dt \quad (3)$$

In the adsorption process (333 K) before the breakthrough point (0-t$_1$), the captured $C_3H_6$ of HOF-FJU-1 was calculated to be 1.27 mmol (28.5 cm$^3$) and 0.58 mmol (13.0 cm$^3$), respectively. Considering the continuous $C_3H_6$ adsorption during the mass transfer zone (t$_1$-t$_2$), the integration of the entire breakthrough curve gave the maximum loading of HOF-FJU-1 and Y-abtc to be 1.5 mmol (33.6 cm$^3$) and 0.78 mmol (17.5 cm$^3$), corresponding to 1.58 and 0.72 mmol g$^{-1}$, respectively. Due to the poor separation performance of JNU-3, Co-gallate, and KAUST-7 at 333 K, its calculation $C_3H_6$ was determined to be about only 0.63, 0.26, and 0.054 mmol g$^{-1}$. By using the same method, the captured amount of $C_3H_8$ from the breakthrough experiment of the three materials may be obtained.

L. The Isosteric Enthalpies of Adsorption ($Q_{st}$)

Using the data collected of $C_3H_6$ and $C_3H_8$ at 318 K and 333 K to calculate the isosteric enthalpy of adsorption. The data was fitted using a virial-type expression composed of parameters $a_i$ and $b_i$. Then, the $Q_{st}$ (kJ mol$^{-1}$) was calculated from the fitting parameters using (eq. 5), where p is the pressure (mmHg), T is the temperature (K), R is the universal gas constant (8.314 J·mol−119 K$^{-1}$), N is the amount adsorbed (mg g$^{-1}$), and m and n determine the number of terms required to adequately describe the isotherm.

The virial equation be written as follows:

$$\ln p = \ln N + \frac{1}{T}\sum_{i=0}^{m} a_i N_i + \sum_{i=0}^{n} b_i N_i \quad (4)$$

The calculation formula for isosteric enthalpies of adsorption:

$$Q_{st} = -R\sum_{i=0}^{m} a_i N_i \quad (5)$$

M. Multi-Component Separation Experiment

The breakthrough experiment for $CH_4/C_2H_4/C_2H_6/C_3H_6/C_3H_8/CO_2/H_2$ (31/10/25/10/10/1/13, v/v/v/v/v/v/v) mixtures was carried out on the apparatus reported in our previous work (Li et al, 2018) with flow a rate of 2 mL min$^{-1}$ (333 K, 1 bar). Activated HOF-FJU-1 powder (0.536 g) was packed into Φ 4×100 mm stainless steel column. Prior to the breakthrough experiment, the sample was activated by flushing the adsorption bed with helium gas for 2 h at 323 K. The desorption process was carried out by He flow (10 mL min$^{-1}$) at 333 K.

All of the compounds, material, compositions, and methods disclosed and claimed herein can be made and executed without undue experimentation in light of the present disclosure. While the disclosure may have focused on several embodiments or may have been described in terms of preferred embodiments, it will be apparent to those of skill in the art that variations and modifications may be applied to the compounds, compositions, and methods without departing from the spirit, scope, and concept of the invention. All variations and modifications apparent to those skilled in the art are deemed to be within the spirit, scope, and concept of the invention as defined by the appended claims.

References

The following references, to the extent that they provide exemplary procedural or other details supplementary to those set forth herein, are specifically incorporated herein by reference.

S. Zhou, Y. Wei, L. Li, Y. Duan, Q. Hou, L. Zhang, L.-X. Ding, J. Xue, H. Wang, J. Caro, Paralyzed membrane: Current-driven synthesis of a metal-organic framework with sharpened propene/propane separation. Sci. Adv. 4, eaau1393 (2018).

B. Zheng, G. Maurin, Mechanical Control of the Kinetic Propylene/Propane Separation by Zeolitic Imidazolate Framework-8. Angew. Chem. Int. Ed. 58, 13734-13738 (2019).

C. Moretti, M. Junginger, L. Shen, Environmental life cycle assessment of polypropylene made from used cooking oil. Resour. Conserv. Recy. 157, 104750 (2020).

Y. He, R. Krishna, B. Chen, Metal-organic frameworks with potential for energy-efficient adsorptive separation of light hydrocarbons. Energy Environ. Sci. 5, 9107-9120 (2012).

H. R. Amedi, M. Aghajani, Economic Estimation of Various Membranes and Distillation for Propylene and Propane Separation. Ind. Eng. Chem. Res. 57, 4366-4376 (2018).

E. D. Bloch, W. L. Queen, R. Krishna, J. M. Zadrozny, C. M. Brown, J. R. Long, Hydrocarbon separations in a metal-organic framework with open iron(II) coordination sites. Science 335, 1606-1610 (2012).

D. S. Sholl, R. P. Lively, Seven chemical separations to change the world. Nature 532, 435-437 (2016).

K.-J. Chen, D. G. Madden, S. Mukherjee, T. Pham, K. A. Forrest, A. Kumar, B. Space, J. Kong, Q.-Y. Zhang, M. J. Zaworotko, Synergistic sorbent separation for one-step ethylene purification from a four-component mixture. Science 366, 241-246 (2019).

S. Yang, A. J. Ramirez-Cuesta, R. Newby, V. Garcia-Sakai, P. Manuel, S. K. Callear, S. I. Campbell, C. C. Tang, M. Schroder, Supramolecular binding and separation of hydrocarbons within a functionalized porous metal-organic framework. Nat. Chem. 7, 121-129 (2014).

X. Cui, K. Chen, H. Xing, Q. Yang, R. Krishna, Z. Bao, H. Wu, W. Zhou, X. Dong, Y. Han, B. li, Q. Ren, M. J. Zaworotko, B. Chen, Pore chemistry and size control in hybrid porous materials for acetylene capture from ethylene. Science 353, 141-144 (2016).

H. Furukawa, K. E. Cordova, M. O'Keeffe, O. M. Yaghi, The chemistry and applications of metal-organic frameworks. Science 341, 1230444 (2013).

P.-Q. Liao, N.-Y. Huang, W.-X. Zhang, J.-P. Zhang, X.-M. Chen, Controlling guest conformation for efficient purification of butadiene. Science 356, 1193-1196 (2017).

Q. G. Zhai, X. Bu, C. Mao, X. Zhao, L. Daemen, Y. Cheng, A. J. Ramirez-Cuesta, P. Feng, An ultra-tunable platform for molecular engineering of high-performance crystalline porous materials. Nat. Commun. 7, 13645 (2016).

Y. Wang, S. B. Peh, D. Zhao, Alternatives to Cryogenic Distillation: Advanced Porous Materials in Adsorptive Light Olefin/Paraffin Separations. Small 15, e1900058 (2019).

T. Ren, M. Patel, K. Blok, Olefins from conventional and heavy feedstocks: Energy use in steam cracking and alternative processes. Energy 31, 425-451 (2006).

J. A. D. Dobladez, V. I. Á. Maté, S. Á. Torrellas, M. Larriba, Separation of the propane propylene mixture with high recovery by a dual PSA process. Comput. Chem. Eng. 136, 106717 (2020).

Y. S. Bae, C. Y. Lee, K. C. Kim, O. K. Farha, P. Nickias, J. T. Hupp, S. T. Nguyen, R. Q. Snurr, High propene/propane selectivity in isostructural metal-organic frameworks with high densities of open metal sites. Angew. Chem. Int. Ed. 51, 1857-1860 (2012).

A. Cadiau, K. Adil, P. M. Bhatt, Y. Belmabkhout, M. Eddaoudi, A metal-organic framework—based splitter for separating propylene from propane. Science 353, 137-140 (2016).

H. Wang, X. Dong, V. Colombo, Q. Wang, Y. Liu, W. Liu, X. L. Wang, X. Y. Huang, D. M. Proserpio, A. Sironi, Y. Han, J. Li, Tailor-Made Microporous Metal-Organic Frameworks for the Full Separation of Propane from Propylene Through Selective Size Exclusion. Adv. Mater. 30, e1805088 (2018).

Q. Ding, Z. Zhang, C. Yu, P. Zhang, J. Wang, X. Cui, C.-H. He, S. Deng, H. Xing, Exploiting equilibrium-kinetic synergetic effect for separation of ethylene and ethane in a microporous metal-organic framework. Sci. Adv. 6, eaaz4322 (2020).

Z. Chen, P. Li, R. Anderson, X. Wang, X. Zhang, L. Robison, L. R. Redfern, S. Moribe, T. Islamoglu, D. A. Gomez-Gualdrón, T. Yildirim, J. F. Stoddart, O. K. Farha, Balancing volumetric and gravimetric uptake in highly porous materials for clean energy. Science 368, 297-303 (2020).

R. Liu, K. T. Tan, Y. Gong, Y. Chen, Z. Li, S. Xie, T. He, Z. Lu, H. Yang, D. Jiang, Covalent organic frameworks: an ideal platform for designing ordered materials and advanced applications. Chem. Soc. Rev. 50, 120-242 (2021).

T. Ma, E. A. Kapustin, S. X. Yin, L. Liang, Z. Zhou, J. Niu, L.-H. Li, Y. Wang, J. Su, J. Li, X. Wang, W. D. Wang, W. Wang, J. Sun, O. M. Yaghi, Single-crystal x-ray diffraction structures of covalent organic frameworks. Science 361, 48-52 (2018).

B. Li, Y. Zhang, R. Krishna, K. Yao, Y. Han, Z. Wu, D. Ma, Z. Shi, T. Pham, B. Space, J. Liu, P. K. Thallapally, J. Liu, M. Chrzanowski, S. Ma, Introduction of pi-complexation into porous aromatic framework for highly selective adsorption of ethylene over ethane. J. Am. Chem. Soc. 136, 8654-8660 (2014).

A. Pulido, L. Chen, T. Kaczorowski, D. Holden, M. A. Little, S. Y. Chong, B. J. Slater, D. P. McMahon, B. Bonillo, C. J. Stackhouse, A. Stephenson, C. M. Kane, R. Clowes, T. Hasell, A. I. Cooper, G. M. Day, Functional materials discovery using energy-structure-function maps. Nature 543, 657-664 (2017).

P. Li, P. Li, M. R. Ryder, Z. Liu, C. L. Stern, O. K. Farha, J. F. Stoddart, Interpenetration Isomerism in Triptycene-Based Hydrogen-Bonded Organic Frameworks. Angew. Chem. Int. Ed. 58, 1664-1669 (2019).

X. Ding, Z. Liu, Y. Zhang, G. Ye, J. Jia, J. Chen, Binary Solvent Regulated Architecture of Ultra-Microporous Hydrogen-Bonded Organic Frameworks with Tunable Polarization for Highly-Selective Gas Separation. Angew. Chem. Int. Ed. 61, e202116483 (2022).

L. Li, R.-B. Lin, R. Krishna, H. Li, S. Xiang, H. Wu, J. Li, W. Zhou, B. Chen, Ethane/ethylene separation in a metal-organic framework with iron-peroxo sites. Science 362, 443-446 (2018).

J. Li, L. Jiang, S. Chen, A. Kirchon, B. Li, Y. Li, H. C. Zhou, Metal-Organic Framework Containing Planar Metal-Binding Sites: Efficiently and Cost-Effectively Enhancing the Kinetic Separation of $C_2H_2/C_2H_4$. J. Am. Chem. Soc. 141, 3807-3811 (2019).

A. Knebel, A. Bavykina, S. J. Datta, L. Sundermann, L. Garzon-Tovar, Y. Lebedev, S. Durini, R. Ahmad, S. M. Kozlov, G. Shterk, M. Karunakaran, I. D. Carja, D. Simic, I. Weilert, M. Kluppel, U. Giese, L. Cavallo, M. Rueping, M. Eddaoudi, J. Caro, J. Gascon, Solution processable metal-organic frameworks for mixed matrix membranes using porous liquids. Nat. Mater. 19, 1346-1353 (2020).

R. B. Lin, L. Li, H. L. Zhou, H. Wu, C. He, S. Li, R. Krishna, J. Li, W. Zhou, B. Chen, Molecular sieving of ethylene from ethane using a rigid metal-organic framework. Nat. Mater. 18, 1128-1133 (2018).

J. E. Bachman, M. T. Kapelewski, D. A. Reed, M. I. Gonzalez, J. R. Long, $M_2$(m-dobdc) (M=Mn, Fe, Co, Ni) Metal-Organic Frameworks as Highly Selective, High-Capacity Adsorbents for Olefin/Paraffin Separations. J. Am. Chem. Soc. 139, 15363-15370 (2017).

S. J. Geier, J. A. Mason, E. D. Bloch, W. L. Queen, M. R. Hudson, C. M. Brown, J. R. Long, Selective adsorption of ethylene over ethane and propylene over propane in the metal-organic frameworks $M_2$(dobdc) (M=Mg, Mn, Fe, Co, Ni, Zn). Chem. Sci. 4, 2054 (2013).

K. Li, D. H. Olson, J. Seidel, T. J. Emge, H. Gong, H. Zeng, J. Li, Zeolitic Imidazolate Frameworks for Kinetic Separation of Propane and Propene. J. Am. Chem. Soc. 131, 10368-10369 (2009).

B. Liang, X. Zhang, Y. Xie, R. B. Lin, R. Krishna, H. Cui, Z. Li, Y. Shi, H. Wu, W. Zhou, B. Chen, An Ultramicroporous Metal-Organic Framework for High Sieving Separation of Propylene from Propane. J. Am. Chem. Soc. 142, 17795-17801 (2020).

H. Zeng, M. Xie, T. Wang, R.-J. Wei, X.-J. Xie, Y. Zhao, W. Lu, D. Li, Orthogonal-array dynamic molecular sieving of propylene/propane mixtures. Nature 595, 542-548 (2021).

C. Gu, N. Hosono, J.-J. Zheng, Y. Sato, S. Kusaka, S. Sakaki, S. Kitagawa, Design and control of gas diffusion process in a nanoporous soft crystal. Science 363, 387-391 (2019).

H. Wang, X. Dong, E. Velasco, D. H. Olson, Y. Han, J. Li, One-of-a-kind: a microporous metal-organic framework capable of adsorptive separation of linear, mono- and di-branched alkane isomers via temperature- and adsorbate-dependent molecular sieving. Energy Environ. Sci. 11, 1226-1231 (2018).

P. L. Llewellyn, S. Bourrelly, C. Serre, Y. Filinchuk, G. Férey, How hydration drastically improves adsorption selectivity for $CO_2$ over $CH_4$ in the flexible chromium terephthalate MIL-53. Angew. Chem. Int. Ed. 45, 7751-7754 (2006).

N. Nijem, H. Wu, P. Canepa, A. Marti, K. J. Balkus, Jr., T. Thonhauser, J. Li, Y. J. Chabal, Tuning the gate opening pressure of Metal-Organic Frameworks (MOFs) for the selective separation of hydrocarbons. J. Am. Chem. Soc. 134, 15201-15204 (2012).

Y. Yang, L. Li, R.-B. Lin, Y. Ye, Z. Yao, L. Yang, F. Xiang, S. Chen, Z. Zhang, S. Xiang, B. Chen, Ethylene/ethane separation in a stable hydrogen-bonded organic framework through a gating mechanism. Nat. Chem. 13, 933-939 (2021).

W. Yang, A. Greenaway, X. Lin, R. Matsuda, A. J. Blake, C. Wilson, W. Lewis, P. Hubberstey, S. Kitagawa, N. R. Champness, M. Schröder, Exceptional Thermal Stability in a Supramolecular Organic Framework: Porosity and Gas Storage. J. Am. Chem. Soc. 132, 14457-14469 (2010).

M. Mastalerz, I. M. Oppel, Rational construction of an extrinsic porous molecular crystal with an extraordinary high specific surface area. Angew. Chem. Int. Ed. 51, 5252-5255 (2012).

T.-H. Chen, I. Popov, W. Kaveevivitchai, Y.-C. Chuang, Y.-S. Chen, 0. Daugulis, A. J. Jacobson, O. Š. Miljanić, Thermally robust and porous noncovalent organic framework with high affinity for fluorocarbons and CFCs. Nat. Commun. 5, 5131 (2014).

I. Hisaki, C. Xin, K. Takahashi, T. Nakamura, Designing Hydrogen-Bonded Organic Frameworks (HOFs) with Permanent Porosity. Angew. Chem. Int. Ed. 58, 11160-11170 (2019).

J. R. Li, R. J. Kuppler, H. C. Zhou, Selective gas adsorption and separation in metal-organic frameworks. Chem. Soc. Rev. 38, 1477-1504 (2009).

S. Krause, N. Hosono, S. Kitagawa, Chemistry of Soft Porous Crystals—Structural Dynamics and Gas Adsorption Properties. Angew. Chem. Int. Ed. 59, 15325-15341 (2020).

Y. Yang, L. Li, R.-B. Lin, Y. Ye, Z. Yao, L. Yang, F. Xiang, S. Chen, Z. Zhang, S. Xiang, B. Chen, Ethylene/ethane separation in a stable hydrogen-bonded organic framework through a gating mechanism. Nat. Chem. 13, 933-939 (2021).

H. Wang, X. Dong, V. Colombo, Q. Wang, Y. Liu, W. Liu, X. L. Wang, X. Y. Huang, D. M. Proserpio, A. Sironi, Y. Han, J. Li, Tailor-Made Microporous Metal-Organic Frameworks for the Full Separation of Propane from Propylene Through Selective Size Exclusion. Adv. Mater. 30, e1805088 (2018).

H. Zeng, M. Xie, T. Wang, R.-J. Wei, X.-J. Xie, Y. Zhao, W. Lu, D. Li, Orthogonal-array dynamic molecular sieving of propylene/propane mixtures. Nature 595, 542-548 (2021).

B. Liang, X. Zhang, Y. Xie, R. B. Lin, R. Krishna, H. Cui, Z. Li, Y. Shi, H. Wu, W. Zhou, B. Chen, An Ultramicroporous Metal-Organic Framework for High Sieving Separation of Propylene from Propane. J. Ain. Chem. Soc. 142, 17795-17801 (2020).

A. Cadiau, K. Adil, P. M. Bhatt, Y. Belmabkhout, M. Eddaoudi, A metal-organic framework—based splitter for separating propylene from propane. Science 353, 137-140 (2016).

R. B. Lin, L. Li, H. L. Zhou, H. Wu, C. He, S. Li, R. Krishna, J. Li, W. Zhou, B. Chen, Molecular sieving of ethylene from ethane using a rigid metal-organic framework. Nat. Mater. 18, 1128-1133 (2018).

L. Li, R.-B. Lin, R. Krishna, H. Li, S. Xiang, H. Wu, J. Li, W. Zhou, B. Chen, Ethane/ethylene separation in a metal-organic framework with iron-peroxo sites. Science 362, 443-446 (2018).

What is claimed is:

1. A method of separating propylene from a mixture containing propylene, comprising contacting the mixture with a framework of repeating units of the formula:

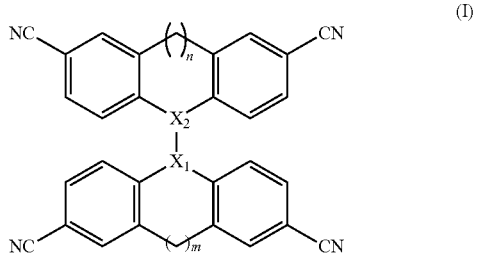

(I)

wherein
X$_1$ and X$_2$ are independently CH$_2$ or N;
m and n are independently 0 or 1;
or a hydrate thereof.

2. The method of claim 1, wherein the formula is further defined as:

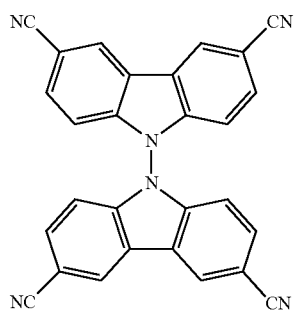 [SMILES: N#Cc1ccc2c(c1)c1cc(C#N)ccc1n2-n1c2ccc(C#N)cc2c2cc(C#N)ccc21]

or a hydrate thereof.

3. The method of claim 1, wherein the framework contains a plurality of pores.

4. The method of claim 3, wherein the pores are from about 3 Å to about 4 Å.

5. The method of claim 1, wherein the propylene is in the gaseous form.

6. The method of claim 1, wherein the mixture containing propylene is a mixture of molecules in the gaseous form.

7. The method of claim 1, wherein the mixture containing propylene comprises a mixture of propylene and propane.

8. The method of claim 7, wherein both the propylene and propane are in the gaseous form.

9. The method of claim 7, wherein the mixture is about an equimolar mixture of propylene and propane.

10. The method of claim 7, wherein the mixture further comprises at least one gas from the group of consisting of CH$_4$, C$_2$H$_4$, C$_2$H$_6$, CO$_2$, and H$_2$.

11. The method of claim 1, wherein the framework exhibits a selectivity for propylene over propane of greater than 100.

12. The method of claim 11, wherein the selectivity for propylene over propane is greater than 600.

13. The method of claim 1, wherein the framework exhibits an uptake ratio for propylene over propane greater than 25.

14. The method of claim 13, wherein the framework has an uptake ratio for propylene over propane greater than 50.

15. The method of claim 1, wherein the material has a capture capacity from about 4 to about 6 mol kg$^{-1}$.

16. The method of claim 15, wherein the capture capacity is from about 4.8 to about 5.4 mol kg$^{-1}$.

17. The method of claim 1, wherein the method is carried out at a temperature from about 10° C. to about 100° C.

18. The method of claim 17, wherein the temperature is from about 20° C. to about 40° C.

19. The method of claim 17, wherein the method is carried out at a temperature of about 25° C.

20. The method of claim 17, wherein the temperature is from about 50° C. to about 70° C.

21. The method of claim 10, wherein the method is carried out at a temperature of about 60° C.

22. The method of claim 1, wherein the method is carried out at a pressure from about 5 mbar to about 7.5 bar.

23. The method of claim 22, wherein the pressure is from about 500 mbar to about 5 bar.

24. The method of claim 22, wherein the method is carried out at a pressure of about 1 bar.

25. The method of claim 22, wherein the method is carried out at a pressure of about 3 bar.

* * * * *